United States Patent
Zong et al.

(10) Patent No.: US 11,184,757 B2
(45) Date of Patent: Nov. 23, 2021

(54) COMMUNICATION METHOD, COMMUNICATIONS DEVICE, AND COMMUNICATIONS SYSTEM

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/748,340

(22) Filed: Jan. 21, 2020

(65) Prior Publication Data
US 2020/0162888 A1    May 21, 2020

Related U.S. Application Data

(63) Continuation of application No. PCT/CN2018/097138, filed on Jul. 26, 2018.

(30) Foreign Application Priority Data

Jul. 31, 2017  (CN) .......................... 201710640133.9

(51) Int. Cl.
*H04W 8/08* (2009.01)
*H04W 60/04* (2009.01)

(52) U.S. Cl.
CPC ............ *H04W 8/08* (2013.01); *H04W 60/04* (2013.01)

(58) Field of Classification Search
CPC ....... H04W 8/08; H04W 60/04; H04W 24/04; H04W 36/00; H04W 36/12; H04W 68/00; H04W 36/0033
See application file for complete search history.

(56) References Cited

U.S. PATENT DOCUMENTS 9,608,860 B1 * 3/2017 Qian .................... H04W 24/04
2006/0088167 A1   4/2006 Bade et al.
(Continued)

FOREIGN PATENT DOCUMENTS

CN    101043712 A    9/2007
CN    101247255 A    8/2008
(Continued)

OTHER PUBLICATIONS

"3rd Generation Partnership Project; Technical Specification Group Services and System Aspects; System Architecture for the 5G System; Stage 2 (Release 15)," 3GPP TS 23.501, V1.2.0, Jul. 26, 2017, 166 pages.
(Continued)

*Primary Examiner* — Minjung Kim
(74) *Attorney, Agent, or Firm* — Conley Rose, P.C.

(57) ABSTRACT

A communication method, a communications device, and a communications system to avoid, when an access and mobility management function (AMF) entity fails, a case in which a re-registration process of a terminal that is being served is triggered because a context of the terminal is lost. The method includes: obtaining, by a communications device, a first group identifier of a terminal group to which a first terminal served by a first mobility management entity belongs; and sending, by the communications device, a message related to the first terminal to a second mobility management entity based on the first group identifier when an exception occurs in the first mobility management entity, where the second mobility management entity is a mobility management entity in which a context of the first terminal exists.

20 Claims, 12 Drawing Sheets

(56) References Cited

U.S. PATENT DOCUMENTS

| | | | |
|---|---|---|---|
| 2008/0065637 A1 | 3/2008 | Farlee et al. | |
| 2011/0235505 A1* | 9/2011 | Eswara | H04L 43/10 |
| | | | 370/221 |
| 2013/0188555 A1* | 7/2013 | Olsson | H04W 8/30 |
| | | | 370/328 |
| 2014/0219178 A1 | 8/2014 | Lopez et al. | |
| 2014/0253567 A1 | 9/2014 | Moy et al. | |
| 2018/0049024 A1* | 2/2018 | Schliwa-Bertling | H04W 8/30 |
| 2018/0249479 A1* | 8/2018 | Cho | H04W 72/1268 |
| 2018/0376384 A1* | 12/2018 | Youn | H04W 8/02 |

FOREIGN PATENT DOCUMENTS

| | | |
|---|---|---|
| CN | 101730124 A | 6/2010 |
| CN | 102740266 A | 10/2012 |
| EP | 2615874 A1 | 7/2013 |
| GN | 1763684 A | 4/2006 |
| WO | 2011141154 A1 | 11/2011 |
| WO | 2013078733 A1 | 6/2013 |
| WO | 2013110352 A1 | 8/2013 |

OTHER PUBLICATIONS

Sun, W., et al., "QoS Context Transfer Based Seamless Handover Method for Mobile IPv6," Journal of Chinese Computer Systems, vol. 27 No. 11, with an English abstract, 6 pages. Abstract only.

* cited by examiner

COMMUNICATION METHOD, COMMUNICATIONS DEVICE, AND COMMUNICATIONS SYSTEM

CROSS-REFERENCE TO RELATED APPLICATIONS

This application is a continuation of International Patent Application No. PCT/CN2018/097138, filed on Jul. 26, 2018, which claims priority to Chinese Patent Application No. 201710640133.9, filed on Jul. 31, 2017. The disclosures of the aforementioned applications are hereby incorporated by reference in their entireties.

TECHNICAL FIELD

This application relates to the field of communications technologies, and in particular, to a communication method, a communications device, and a communications system.

BACKGROUND

In other approaches, when an access and mobility management function (AMF) entity determines to no longer serve a terminal, the AMF entity sends an "unavailable" indication to a radio access network (RAN) device and another core network functional entity such as a session management function (SMF) entity, and the RAN device and the other core network functional entity mark the AMF entity as failed. In this way, the AMF entity is no longer considered during subsequent AMF entity selection. However, if the AMF fails and a context of a terminal that is being served by the failed AMF entity is not backed up, a network connection of the terminal will be lost, and a re-registration process needs to be initiated subsequently.

A method in other approaches includes: backing up the context of the terminal into an unstructured data storage function (UDSF) entity. In this way, when the AMF entity fails, the RAN device or the other core network functional entity re-selects a target AMF entity that does not fail, to continue to serve the terminal. The target AMF entity reads the context of the terminal from the UDSF entity to continue to serve the terminal, such that the terminal does not need to initiate the re-registration process.

However, because the foregoing solution depends on the UDSF entity, a group of AMF entities that are backups of each other need to come from a same manufacturer. When the AMF entities that are backups of each other come from different manufacturers, because data formats between the UDSF entity and AMF entities of different manufacturers are not the same, a context of a terminal that is being served by a failed AMF entity may be lost, and consequently, a re-registration process of the terminal is triggered.

SUMMARY

Embodiments of this application provide a communication method, a communications device, and a communications system to avoid, when a mobility management entity fails, a case in which a re-registration process of a terminal that is being served is triggered because a context of the terminal is lost.

To achieve the foregoing objective, the following technical solutions are provided in the embodiments of this application.

According to a first aspect, a communication method is provided. The method includes: obtaining, by a communications device, a first group identifier of a terminal group to which a first terminal served by a first mobility management entity belongs; and sending, by the communications device, a message related to the first terminal to a second mobility management entity based on the first group identifier when an exception occurs in the first mobility management entity, where the second mobility management entity is a mobility management entity in which a context of the first terminal exists. According to the solution, because the first mobility management entity may synchronize the context of the served first terminal to the second mobility management entity, when the exception occurs in the first mobility management entity, the message related to the first terminal may be sent to the second mobility management entity based on the first group identifier of the terminal group to which the first terminal belongs. Therefore, when the exception occurs in the first mobility management entity, a case in which a re-registration process of the terminal that is being served is triggered because the context of the terminal is lost can be avoided; in other words, a current process of the terminal that is being served can remain uninterrupted.

Optionally, the first group identifier is a serving group identifier configured in the first mobility management entity and a backup group identifier configured in the second mobility management entity. The serving group identifier in this embodiment of this application is used to indicate that when no exception occurs in a mobility management entity in which the serving group identifier is configured, a terminal in a terminal group whose group identifier is the serving group identifier is served by the mobility management entity in which the serving group identifier is configured. The backup group identifier in this embodiment of this application is used to indicate that when an exception occurs in a mobility management entity in which the backup group identifier is configured as a serving group identifier, a terminal in a terminal group whose group identifier is the backup group identifier is served by a mobility management entity in which the backup group identifier is configured as a backup group identifier.

In a possible design, the method further includes receiving, by the communications device, a first indication message, where the first indication message is used to indicate that a terminal in the terminal group corresponding to the first group identifier is served by the second mobility management entity.

Optionally, receiving, by the communications device, a first indication message includes receiving, by the communications device, the first indication message from the second mobility management entity, where the first indication message is sent by the second mobility management entity to the communications device when the second mobility management entity determines that the exception occurs in the first mobility management entity. In other words, only when the second mobility management entity determines that the exception occurs in the first mobility management entity, the second mobility management entity notifies the communications device that the terminal in the terminal group corresponding to the first group identifier is served by the second mobility management entity. In this way, the communications device may send the message related to the first terminal to the second mobility management entity based on the first indication message and the first group identifier.

In a possible design, the method further includes receiving, by the communications device, a first indication message, where the first indication message is used to indicate that when the exception occurs in the first mobility management entity, a terminal in the terminal group corresponding to the first group identifier is served by the second mobility management entity.

Optionally, receiving, by the communications device, a first indication message includes receiving, by the communications device, the first indication message before the exception occurs in the first mobility management entity. Additionally, sending, by the communications device, a message related to the first terminal to a second mobility management entity based on the first group identifier when an exception occurs in the first mobility management entity includes: determining, by the communications device, that the exception occurs in the first mobility management entity; and sending, by the communications device, the message related to the first terminal to the second mobility management entity based on the first group identifier. In other words, before the exception occurs in the first mobility management entity, the communications device may learn in advance that, when the exception occurs in the first mobility management entity, the terminal in the terminal group corresponding to the first group identifier is served by the second mobility management entity. In this way, when the exception occurs in the first mobility management entity, the communications device may send the message related to the first terminal to the second mobility management entity based on the first indication message and the first group identifier.

In this embodiment of this application, the first indication message may be notified by the second mobility management entity to the communications device, or may be notified by the first mobility management entity or a network manager to the communications device. This is not specifically limited in this embodiment of this application.

Optionally, obtaining, by a communications device, a first group identifier of a terminal group to which a first terminal served by a first mobility management entity belongs includes: receiving, by the communications device, the message related to the first terminal, where the message related to the first terminal carries the first group identifier of the terminal group to which the first terminal belongs; or determining, by the communications device from the context of the first terminal, the first group identifier of the terminal group to which the first terminal belongs. According to the solution, the communications device may obtain the group identifier of the terminal group to which the first terminal served by the first mobility management entity belongs.

Optionally, the method further includes: obtaining, by the communications device, a second group identifier of a terminal group to which a second terminal served by the first mobility management entity belongs; and sending, by the communications device, a message related to the second terminal to a third mobility management entity based on the second group identifier when the exception occurs in the first mobility management entity, where the third mobility management entity is a mobility management entity in which a context of the second terminal exists. According to the solution, because the first mobility management entity may further synchronize the context of the served second terminal to the third mobility management entity, when the exception occurs in the first mobility management entity, the message related to the second terminal may be sent to the third mobility management entity based on the second group identifier of the terminal group to which the second terminal belongs. Therefore, when the exception occurs in the first mobility management entity, a case in which a re-registration process of the terminal that is being served is triggered because the context of the terminal is lost can be avoided; in other words, a current process of the terminal that is being served can remain uninterrupted. In addition, because the first mobility management entity may group terminals, contexts of terminals in different terminal groups may be respectively backed up to a plurality of different mobility management entities. In other words, one-to-many backup may be implemented. In this way, when the exception occurs in the first mobility management entity, the plurality of different mobility management entities separately take over one or more terminal groups of the first mobility management entity. Therefore, impact on a single mobility management entity due to the exception of the first mobility management entity is reduced, resources are saved compared with conventional 1+1 backup, and further, a problem that a context in a mobility management entity (MME) pool in a conventional system is lost is resolved.

Optionally, the communications device is an access device or a session management entity.

According to a second aspect, a communication method is provided. The method includes: receiving, by a second mobility management entity from a first mobility management entity, a context of a first terminal served by the first mobility management entity; determining, by the second mobility management entity, that an exception occurs in the first mobility management entity; and sending, by the second mobility management entity, a first indication message to a communications device, where the first indication message is used to indicate that a terminal in a terminal group corresponding to a first group identifier is served by the second mobility management entity, and the first group identifier is a group identifier of a terminal group to which the first terminal belongs. According to the solution, because the first mobility management entity may synchronize the context of the served first terminal to the second mobility management entity, when the exception occurs in the first mobility management entity, the second mobility management entity may notify the communications device that the terminal in the terminal group corresponding to the first group identifier is served by the second mobility management entity, where the first group identifier is the group identifier of the terminal group to which the first terminal belongs. Therefore, the communications device may send a message related to the first terminal to the second mobility management entity based on the first indication message and the first group identifier, such that when the exception occurs in the first mobility management entity, a case in which a re-registration process of the terminal that is being served is triggered because the context of the terminal is lost can be avoided; in other words, a current process of the terminal that is being served can remain uninterrupted.

Optionally, the method further includes receiving, by the second mobility management entity, a message related to the first terminal from the communications device. According to the solution, the second mobility management entity may obtain the message related to the first terminal.

Optionally, the method includes: receiving, by the second mobility management entity from a third mobility management entity, a context of a second terminal served by the third mobility management entity; determining, by the second mobility management entity, that an exception occurs in the third mobility management entity; and sending, by the second mobility management entity, a second indication message to the communications device, where the second indication message is used to indicate that a terminal in a terminal group corresponding to a second group identifier is served by the second mobility management entity, and the second group identifier is a group identifier of a terminal group to which the second terminal belongs. According to the solution, because the third mobility management entity may synchronize the context of the served second terminal to the second mobility management entity, when the exception occurs in the third mobility management entity, the second mobility management entity may notify the communications device that the terminal in the terminal group corresponding to the second group identifier is served by the second mobility management entity, where the second group identifier is the group identifier of the terminal group to which the second terminal belongs. Therefore, the communications device may send a message related to the second terminal to the second mobility management entity based on the second indication message and the second group identifier, such that when the exception occurs in the third mobility management entity, a case in which a re-registration process of the terminal that is being served is triggered because the context of the terminal is lost can be avoided. In other words, a current process of the terminal that is being served can remain uninterrupted. In addition, because the second mobility management entity may back up the first mobility management entity and the third mobility management entity separately, one-to-many backup may be implemented, such that resources are saved compared with conventional 1+1 backup.

According to a third aspect, a communications device is provided, where the communications device has a function of implementing the method in the first aspect. The function may be implemented using hardware, or may be implemented by executing corresponding software by hardware. The hardware or software includes one or more modules corresponding to the function.

According to a fourth aspect, a communications device is provided, including: a processor, a memory, a bus, and a communications interface. The memory is configured to store a computer executable instruction. The processor is connected to the memory using the bus. When the communications device runs, the processor executes the computer executable instruction stored in the memory, such that the communications device performs the communication method according to any one of the first aspect.

According to a fifth aspect, a computer readable storage medium is provided. The computer readable storage medium stores an instruction, and when the instruction runs on a computer, the computer performs the communication method according to any one of the first aspect.

According to a sixth aspect, a computer program product including an instruction is provided. When the instruction runs on a computer, the computer performs the communication method according to any one of the first aspect.

According to a seventh aspect, a chip system is provided. The chip system includes a processor configured to support a communications device in implementing functions in the foregoing aspects, for example, when an exception occurs in a first mobility management entity, sending a message related to a first terminal to a second mobility management entity based on a first group identifier of a terminal group to which the first terminal served by the first mobility management entity belongs. In a possible design, the chip system further includes a memory configured to store a program instruction and data that are necessary for the communications device. The chip system may include a chip, or may include a chip and another discrete device.

For technical effects brought by any design of the third aspect to the seventh aspect, refer to the technical effects brought by the different designs of the first aspect, and details are not described herein again.

According to an eighth aspect, a second mobility management entity is provided. The second mobility management entity has a function of implementing the method in the second aspect. The function may be implemented using hardware, or may be implemented by executing corresponding software by hardware. The hardware or software includes one or more modules corresponding to the function.

According to a ninth aspect, a second mobility management entity is provided, including: a processor, a memory, a bus, and a communications interface. The memory is configured to store a computer executable instruction. The processor is connected to the memory using the bus. When the second mobility management entity runs, the processor executes the computer executable instruction stored in the memory, such that the second mobility management entity performs the communication method according to any one of the second aspect.

According to a tenth aspect, a computer readable storage medium is provided. The computer readable storage medium stores an instruction. When the instruction runs on a computer, the computer performs the service session establishing method according to any one of the second aspect.

According to an eleventh aspect, a computer program product including an instruction is provided. When the instruction runs on a computer, the computer performs the communication method according to any one of the second aspect.

According to a twelfth aspect, a chip system is provided. The chip system includes a processor configured to support a second mobility management entity in implementing functions in the foregoing aspects, for example, receiving, from a first mobility management entity, a context of a first terminal served by the first mobility management entity. In a possible design, the chip system further includes a memory configured to store a program instruction and data that are necessary for the second mobility management entity. The chip system may include a chip, or may include a chip and another discrete device.

For technical effects brought by any design of the eighth aspect to the twelfth aspect, refer to the technical effects brought by the different designs of the second aspect, and details are not described herein again.

According to a thirteenth aspect, a communications system is provided. The communications system includes a first mobility management entity, a second mobility management entity, and a communications device. The first mobility management entity is configured to send, to the second mobility management entity, a context of a first terminal served by the first mobility management entity. The second mobility management entity is configured to receive the context of the first terminal from the first mobility management entity. The communications device is configured to: obtain a first group identifier of a terminal group to which the first terminal belongs; and send a message related to the first terminal to the second mobility management entity based on the first group identifier when an exception occurs in the first mobility management entity. The second mobility management entity is further configured to receive the message related to the first terminal from the communications device.

In a possible design, the second mobility management entity is further configured to: determine that the exception occurs in the first mobility management entity; and send a first indication message to the communications device, where the first indication message is used to indicate that a terminal in a terminal group corresponding to the first group identifier is served by the second mobility management entity. The communications device is further configured to receive the first indication message.

In a possible design, the communications device is further configured to: receive, before the exception occurs in the first mobility management entity, a first indication message, where the first indication message is used to indicate that when the exception occurs in the first mobility management entity, a terminal in a terminal group corresponding to the first group identifier is served by the second mobility management entity; and determine that the exception occurs in the first mobility management entity.

For technical effects brought by any design of the thirteenth aspect, refer to the technical effects brought by the different designs of the first aspect, and details are not described herein again.

These aspects or other aspects of this application are more comprehensible in descriptions of the following embodiments.

DESCRIPTION OF EMBODIMENTS

The following describes technical solutions in embodiments of this application with reference to the accompanying drawings in the embodiments of this application. In descriptions of this application, "/" means "or" unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two unless otherwise specified. In addition, to facilitate clear description of the technical solutions in the embodiments of this application, words such as "first" and "second" are used in the embodiments of this application to distinguish between same items and similar items that provide basically same functions or purposes. A person skilled in the art may understand that the words such as "first" and "second" do not limit a quantity and an execution order, or do not limit a definite difference. For example, a second mobility management entity and a third mobility management entity in the embodiments of this application may be a same mobility management entity, or may be different mobility management entities. This is not specifically limited in the embodiments of this application.

A network architecture and a service scenario described in the embodiments of this application are used to describe the technical solutions in the embodiments of this application more clearly, and are not construed as a limitation to the technical solutions provided in the embodiments of this application. A person of ordinary skill in the art may understand that as the network architecture evolves and a new service scenario occurs, the technical solutions provided in the embodiments of this application are also applicable to a similar technical problem.

Figure 1:
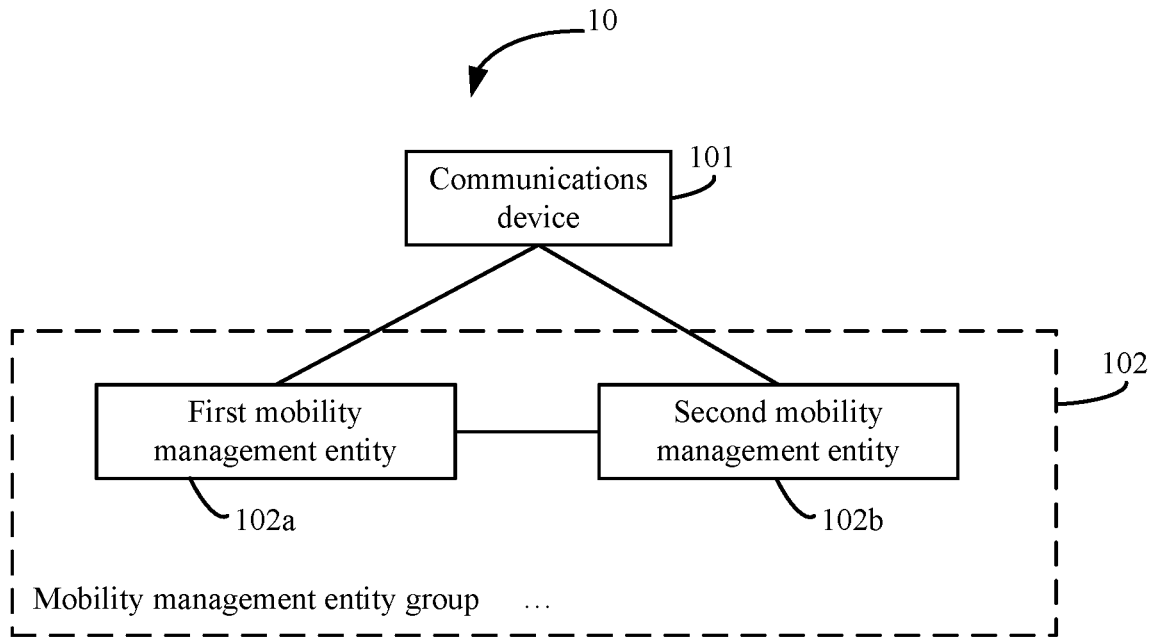
FIG. 1 is a schematic architectural diagram of a communications system according to an embodiment of this application.

FIG. 1 is a schematic architectural diagram of a communications system 10 according to an embodiment of this application. The communications system 10 includes a communications device 101 and a mobility management entity group 102. The mobility management entity group 102 includes at least two mobility management entities that are backups of each other, for example, a first mobility management entity 102a and a second mobility management entity 102b in FIG. 1. Certainly, the mobility management entity group 102 in FIG. 1 may further include another mobility management entity, for example, a third mobility management entity. This is not specifically limited in this embodiment of this application.

The first mobility management entity 102a is configured to send, to the second mobility management entity 102b, a context of a first terminal served by the first mobility management entity 102a.

The communications device 101 is configured to: obtain a first group identifier of a terminal group to which the first terminal belongs; and send a message related to the first terminal to the second mobility management entity 102b based on the first group identifier when an exception occurs in the first mobility management entity 102a.

The second mobility management entity 102b is configured to receive the message related to the first terminal from the communications device 101.

Optionally, the first mobility management entity 102a, the second mobility management entity 102b, and the communications device 101 in FIG. 1 may directly communicate with each other, or may communicate with each other through forwarding performed by another device. This is not specifically limited in this embodiment of this application.

Optionally, the communications device 102 in FIG. 1 may be an access device, a session management function entity, or the like. This is not specifically limited in this embodiment of this application. If the communications device 102 is an access device, the message related to the first terminal is an uplink message related to the first terminal. Alternatively, if the communications device 102 is a session management function entity, the message related to the first terminal is a downlink message related to the first terminal. This is collectively described herein, and details are not described below again.

Optionally, in this embodiment of this application, that an exception occurs in a mobility management entity includes cases in which a fault occurs in the mobility management entity or the mobility management entity is overloaded. This is collectively described herein, and details are not described below again.

According to the communications system provided in this embodiment of this application, because the first mobility management entity may synchronize the context of the served first terminal to the second mobility management entity, when the exception occurs in the first mobility management entity, the message related to the first terminal may be sent to the second mobility management entity based on the first group identifier of the terminal group to which the first terminal belongs. Therefore, when the exception occurs in the first mobility management entity, a case in which a re-registration process of the terminal that is being served is triggered because the context of the terminal is lost can be avoided. In other words, a current process of the terminal that is being served can remain uninterrupted.

It should be noted that, in this embodiment of this application, context synchronization may be: context synchronization triggered by a context change, or may be context synchronization triggered when a set timer expires. A synchronization moment is not specifically limited in this embodiment of this application.

Optionally, the communications system 10 may be applied to a 5th Generation (5G) network and another future network. This is not specifically limited in this embodiment of this application.

Figure 2:
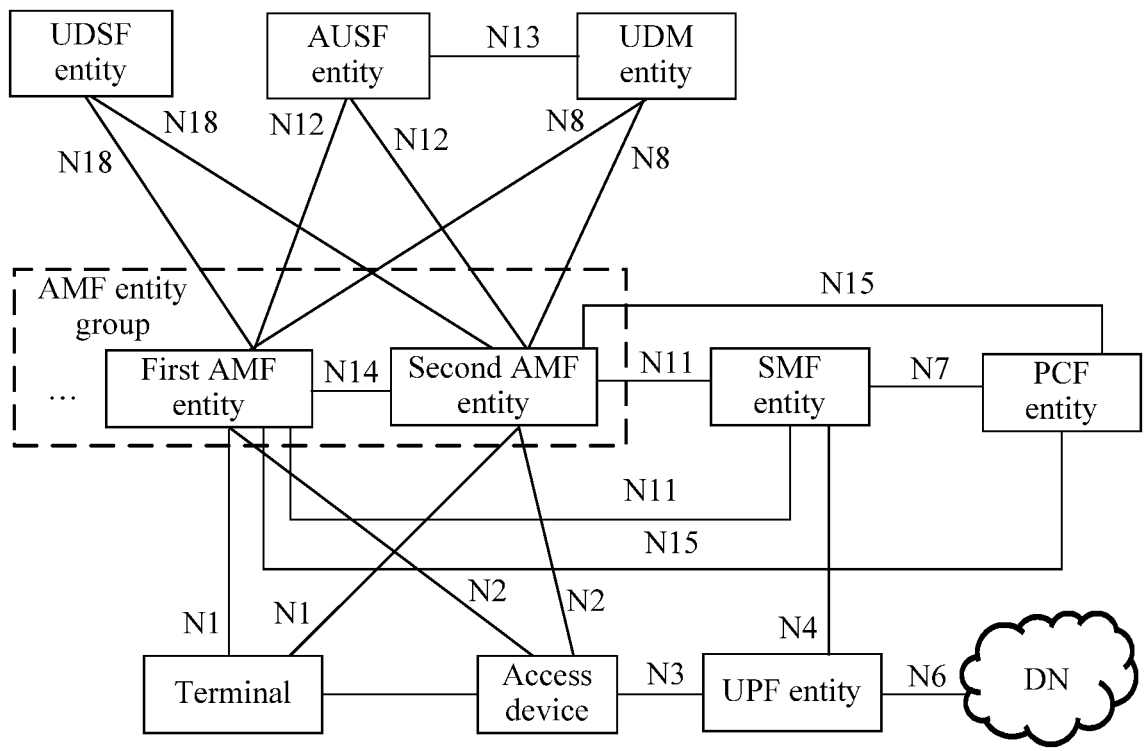
FIG. 2 is a schematic architectural diagram of a 5th Generation (5G) network according to an embodiment of this application.

If the communications system 10 is applied to a 5G network, as shown in FIG. 2, a network element or entity corresponding to the communications device may be an access device or a session management function (SMF) entity, and a network element or entity corresponding to the mobility management entity may be an access and mobility management function (AMF) entity. For example, a network element or entity corresponding to the first mobility management entity 102a may be a first AMF entity, and a network element or entity corresponding to the second mobility management entity 102b may be a second AMF entity.

It should be noted that, only two AMF entities are shown in FIG. 2 as an example. However, in actual deployment, an AMF entity group may alternatively include more than two AMF entities. This is not specifically limited in this embodiment.

In addition, as shown in FIG. 2, the 5G network may further include a user plane function (UPF) entity, a unified data management (UDM) entity, an authentication server function (AUSF) entity, a policy control function (PCF) entity, and the like. Optionally, the 5G network may further include a UDSF entity.

In this embodiment of this application, a terminal accesses a network using the access device and communicates with the first AMF entity and the second AMF entity through a next generation network (N) 1 interface (N1); the first AMF entity communicates with the second AMF entity through an N14 interface (N14); both the first AMF entity and the second AMF entity communicate with the access device through an N2 interface (N2); both the first AMF entity and the second AMF entity communicate with the UDSF entity through an N18 interface (N18); both the first AMF entity and the second AMF entity communicate with the AUSF entity through an N12 interface (N12); both the first AMF entity and the second AMF entity communicate with the UDM entity through an N8 interface (N8); both the first AMF entity and the second AMF entity communicate with the SMF entity through an N11 interface (N11); both the first AMF entity and the second AMF entity communicate with the PCF entity through an N15 interface (N15); the AUSF entity communicates with the UDM entity through an N13 interface (N13); the SMF entity communicates with the UPF entity through an N4 interface (N4); and the UPF entity communicates with a data network (DN) through an N6 interface (N6).

It should be noted that, names of interfaces between the network elements in FIG. 2 are only an example. During implementation, the interfaces may have other names. This is not specifically limited in this embodiment of this application.

It should be noted that, the access device, the first AMF entity, the second AMF entity, the SMF entity, the UDSF entity, the AUSF entity, the UDM entity, the UPF entity, and the PCF entity in FIG. 2 are only names, and the names do not constitute limitations to the devices. In the 5G network and the other future network, network elements or entities corresponding to the access device, the first AMF entity, the second AMF entity, the SMF entity, the UDSF entity, the AUSF entity, the UDM entity, the UPF entity, and the PCF entity may alternatively have other names. This is not specifically limited in this embodiment of this application. For example, the UDM entity may also be replaced with a home subscriber server (HSS), a user subscription database (USD), or a database entity. This is collectively described herein, and details are not described below again.

Optionally, a terminal in this embodiment of this application may include various devices having a wireless communication function, such as a handheld device, an in-vehicle device, a wearable device, and a computing device, or another processing device connected to a wireless modem, and further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a user equipment (UE), a mobile station (MS), a terminal device, and the like. For convenience of description, in this application, the devices mentioned above are collectively referred to as a terminal.

Optionally, the access device in this embodiment of this application is a device used to access a core network, and may be, for example, a base station, a broadband network gateway (BNG), an aggregation switch, or a non-3rd Generation Partnership Project (non-3GPP) access device. The base station may be in various forms, for example, a macro base station, a micro base station (also referred to as a small cell), a relay station, or an access point.

Optionally, for functions of the first AMF entity in this embodiment of this application, refer to functions of the first mobility management entity in FIG. 1, and for functions of the second AMF entity in this embodiment of this application, refer to functions of the second mobility management entity in FIG. 1. Details are not described herein again. In addition, the first AMF entity and the second AMF entity may further be responsible for functions such as registration management, mobility management, and lawful interception. This is not specifically limited in this embodiment of this application.

Optionally, the SMF entity in this embodiment of this application is configured to perform session management, including session-related control functions such as session establishment, session modification, session release, terminal Internet Protocol (IP) address allocation and management, UPF entity selection and control, and lawful interception.

Optionally, the UPF entity in this embodiment of this application may be responsible for processing functions such as terminal packet forwarding and statistics collection. For example, the UPF entity may implement user plane functions of a serving gateway (SGW) and a packet data network gateway (PGW). The UPF entity may be a software defined network (SDN) switch. This is not specifically limited in this embodiment of this application.

Optionally, the AUSF entity in this embodiment of this application is configured to authenticate a terminal based on subscription data of the terminal.

Optionally, the UDM entity in this embodiment of this application is configured to store subscription data. In addition, the UDM entity further has functions such as authentication, subscriber identity processing, and subscription management. This is not specifically limited in this embodiment of this application.

Optionally, the PCF entity in this embodiment of this application has policy-related functions such as providing policy rules and supporting a unified policy architecture to manage network behavior.

Optionally, the UDSF entity provided in this embodiment of this application is configured to store unstructured data of a network entity.

Optionally, the first mobility management entity or the communications device in FIG. 1 may be implemented by one entity device, or may be jointly implemented by a plurality of entity devices, or may be a logical function module in an entity device. This is not specifically limited in this embodiment of this application.

Figure 3:
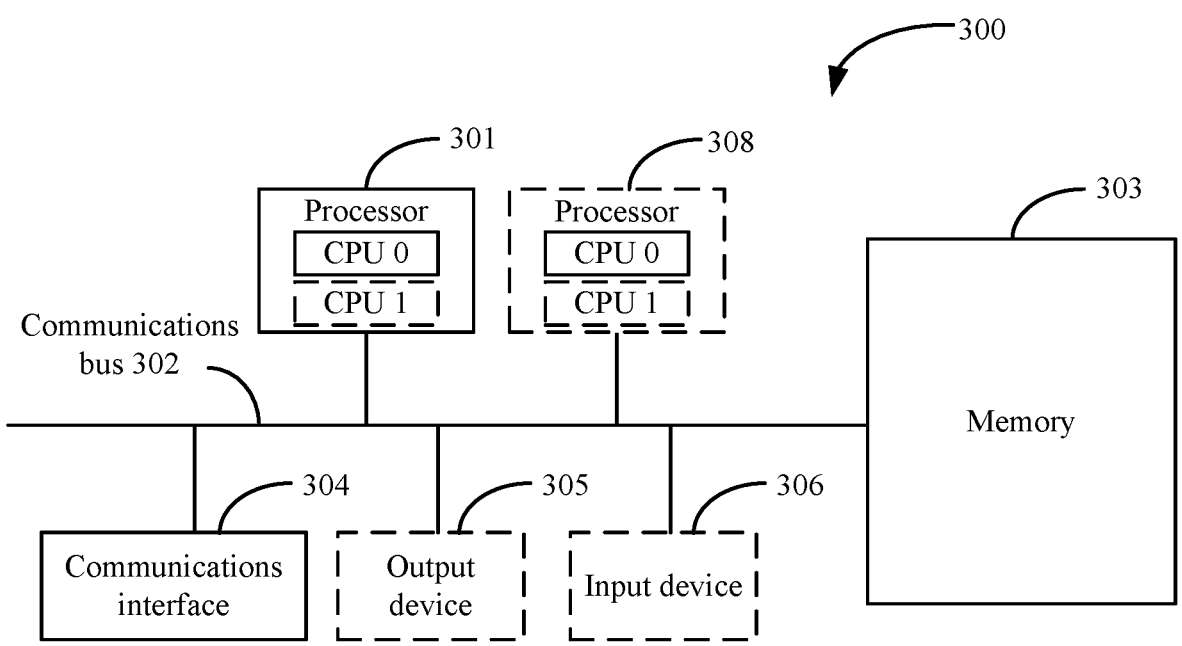
FIG. 3 is a schematic diagram of a hardware structure of a network device according to an embodiment of this application.

For example, the first mobility management entity, the second mobility management entity, or the communications device in FIG. 1 may be implemented using a network device in FIG. 3. FIG. 3 is a schematic diagram of a hardware structure of a network device according to an embodiment of this application. A network device 300 includes at least one processor 301, a communications bus 302, a memory 303, and at least one communications interface 304.

The processor 301 may be a general-purpose central processing unit (CPU), a microprocessor, an application-specific integrated circuit (ASIC), or one or more integrated circuits that are configured to control program execution of solutions of this application.

The communications bus 302 may include a path to transfer information between the foregoing components.

The communications interface 304 uses any apparatus such as a transceiver to communicate with another device or a communications network, for example, the Ethernet, a radio access network (RAN), or a wireless local area network (WLAN).

The memory 303 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 303 is not limited thereto. The memory may exist independently, and is connected to the processor using a bus, or the memory may be integrated with the processor.

The memory 303 is configured to store application program code used to execute the solutions of this application, and the execution is controlled using the processor 301. The processor 301 is configured to execute the application program code stored in the memory 303, to implement the communication methods provided in the following embodiments of this application.

During implementation, in an embodiment, the processor 301 may include one or more CPUs, for example, a CPU 0 and a CPU 1 in FIG. 3.

During implementation, in an embodiment, the network device 300 may include a plurality of processors, for example, a processor 301 and a processor 308 in FIG. 3. Each of the processors may be a single-core (single-CPU) processor, or a multi-core (multi-CPU) processor. The processor herein may be one or more devices, circuits, and/or processing cores for processing data (for example, a computer program instruction).

During implementation, in an embodiment, the network device 300 may further include an output device 305 and an input device 306. The output device 305 communicates with the processor 301, and may display information in various manners. For example, the output device 305 may be a liquid crystal display (LCD), a light emitting diode (LED) display device, a cathode ray tube (CRT) display device, or a projector. The input device 306 communicates with the processor 301, and may receive input of a user in various manners. For example, the input device 306 may be a mouse, a keyboard, a, a touchscreen device, or a sensing device.

The network device 300 may be a general-purpose device or a dedicated device. During implementation, the network device 300 may be a desktop computer, a portable computer, a network server, a palmtop computer (PDA), a mobile phone, a tablet computer, a wireless terminal device, an embedded device, or a device having a structure similar to that shown in FIG. 3. A type of the network device 300 is not limited in this embodiment of this application.

The following describes the communication methods provided in the embodiments of this application in detail with reference to FIG. 1 to FIG. 3.

For example, the communications system shown in FIG. 1 is applied to the 5G network shown in FIG. 2. To help understand the technical solutions in the embodiments of this application, related descriptions about a group identifier of a terminal group and an AMF entity group are first provided below.

I. Group Identifier of a Terminal Group

In the embodiments of this application, an AMF entity may group, according to a local policy or another factor, all terminals served by the AMF entity, and configure a corresponding group identifier for each group of terminals, to facilitate management.

Usually, one AMF entity may correspond to one or more globally unique AMF identifiers (GUAMIs), where the GUAMIs include a public land mobile network (PLMN) identifier (ID), an identifier of a region in which the AMF entity is located (AMF region ID), an identifier of an AMF entity group to which the AMF entity belongs (AMF set ID), and an AMF pointer. A plurality of GUAMIs of one AMF entity may be distinguished using AMF pointers. In other words, different GUAMIs have different AMF pointers. When one AMF entity corresponds to a plurality of GUAMIs, the group identifier of the terminal group in the embodiments of this application may be a GUAMI or an AMF pointer in the GUAMI. When one AMF entity corresponds to one GUAMI, the group identifier of the terminal group in the embodiments of this application may be an AMF pointer and highest N bits of a terminal temporary identifier, that is, the highest N bits of the terminal temporary identifier may be used to identify different terminal groups. For example, highest two bits are used to identify a terminal group, all terminals served by one AMF entity may be grouped into four groups, and terminal temporary identifiers of terminals in the four groups respectively start with 00, 01, 10, and 11. This is equivalent to adding two bits to the AMF pointer. In this case, the AMF entity needs to notify the access device and a core network device of a manner of capturing a group identifier from a terminal identifier. For example, the AMF entity notifies the access device and the core network device of a length of a group identifier of a terminal group. This is collectively described herein, and details are not described below again.

In addition, for brevity of description, in the following embodiments of this application, the group identifier of the terminal is used to replace the group identifier of the terminal group to which the terminal belongs. This is collectively described herein, and details are not described below again.

II. AMF Entity Group

The AMF entity group includes a plurality of AMF entities that are backups of each other, and m serving group identifiers and n backup group identifiers may be configured in each AMF entity. When no exception occurs in an AMF entity, the AMF entity serves a terminal whose group identifier is a serving group identifier corresponding to the AMF entity. In addition, the AMF entity stores a context of a terminal whose group identifier is a backup group identifier corresponding to the AMF entity. When an exception occurs in an AMF entity that serves the terminal whose group identifier is the backup group identifier corresponding to the AMF entity, the AMF entity takes over the terminal, and serves the terminal. The following provides detailed descriptions with reference to some examples.

For example, it is assumed that 1+1 backup is performed for AMF entities. To be more specific, it is assumed that the AMF entity group includes two AMF entities, for example, an AMF entity 1 and an AMF entity 2. The two AMF entities are backups of each other. As shown in Table 1, three serving group identifiers and three backup group identifiers are configured in each AMF entity.

TABLE 1

| Name of an AMF entity | Serving group identifier | Backup group identifier |
| --- | --- | --- |
| AMF entity 1 | Identifier 1, identifier 2, and identifier 3 | Identifier 4, identifier 5, and identifier 6 |
| AMF entity 2 | Identifier 4, identifier 5, and identifier 6 | Identifier 1, identifier 2, and identifier 3 |

Therefore, when no exception occurs in the AMF entity 1, the AMF entity 1 serves terminals whose group identifiers are the identifier 1, the identifier 2, and the identifier 3, and the AMF entity 1 stores contexts of terminals whose group identifiers are the identifier 4, the identifier 5, and the identifier 6. When an exception occurs in the AMF entity 2 that serves the terminals whose group identifiers are the identifier 4, the identifier 5, and the identifier 6, the AMF entity 1 takes over the terminals whose group identifiers are the identifier 4, the identifier 5, and the identifier 6, and serves these terminals.

When no exception occurs in the AMF entity 2, the AMF entity 2 serves the terminals whose group identifiers are the identifier 4, the identifier 5, and the identifier 6, and the AMF entity 2 stores contexts of the terminals whose group identifiers are the identifier 1, the identifier 2, and the identifier 3. When an exception occurs in the AMF entity 1 that serves the terminals whose group identifiers are the identifier 1, the identifier 2, and the identifier 3, the AMF entity 2 takes over the terminals whose group identifiers are the identifier 1, the identifier 2, and the identifier 3, and serves these terminals.

Alternatively, for example, it is assumed that 1+N backup is performed for AMF entities, where N is an integer greater than 1. To be more specific, it is assumed that the AMF entity group includes more than two AMF entities. For example, the AMF entity group includes a total of four AMF entities: an AMF entity 1, an AMF entity 2, an AMF entity 3, and an AMF entity 4. The four AMF entities are backups of each other. As shown in Table 2, three serving group identifiers and three backup group identifiers are configured in each AMF entity.

TABLE 2

| Name of an AMF entity | Serving group identifier | Backup group identifier |
| --- | --- | --- |
| AMF entity 1 | Identifier 1, identifier 2, and identifier 3 | Identifier 4, identifier 7, and identifier 10 |
| AMF entity 2 | Identifier 4, identifier 5, and identifier 6 | Identifier 1, identifier 8, and identifier 11 |
| AMF entity 3 | Identifier 7, identifier 8, and identifier 9 | Identifier 2, identifier 5, and identifier 12 |
| AMF entity 4 | Identifier 10, identifier 11, and identifier 12 | Identifier 3, identifier 6, and identifier 9 |

Therefore, when no exception occurs in the AMF entity 1, the AMF entity 1 serves terminals whose group identifiers are the identifier 1, the identifier 2, and the identifier 3, and the AMF entity 1 stores contexts of terminals whose group identifiers are the identifier 4, the identifier 7, and the identifier 10. When an exception occurs in the AMF entity 2 that serves a terminal whose group identifier is the identifier 4, the AMF entity 1 takes over the terminal whose group identifier is the identifier 4, and serves the terminal. When an exception occurs in the AMF entity 3 that serves a terminal whose group identifier is the identifier 7, the AMF entity 1 takes over the terminal whose group identifier is the identifier 7, and serves the terminal. When an exception occurs in the AMF entity 4 that serves a terminal whose group identifier is the identifier 10, the AMF entity 1 takes over the terminal whose group identifier is the identifier 10, and serves the terminal.

When no exception occurs in the AMF entity 2, the AMF entity 2 serves terminals whose group identifiers are the identifier 4, the identifier 5, and the identifier 6, and the AMF entity 2 stores contexts of terminals whose group identifiers are the identifier 1, the identifier 8, and the identifier 11. When an exception occurs in the AMF entity 1 that serves a terminal whose group identifier is the identifier 1, the AMF entity 2 takes over the terminal whose group identifier is the identifier 1, and serves the terminal. When an exception occurs in the AMF entity 3 that serves a terminal whose group identifier is the identifier 8, the AMF entity 2 takes over the terminal whose group identifier is the identifier 8, and serves the terminal. When an exception occurs in the AMF entity 4 that serves a terminal whose group identifier is the identifier 11, the AMF entity 2 takes over the terminal whose group identifier is the identifier 11, and serves the terminal.

When no exception occurs in the AMF entity 3, the AMF entity 3 serves terminals whose group identifiers are the identifier 7, the identifier 8, and the identifier 9, and the AMF entity 3 stores contexts of terminals whose group identifiers are the identifier 2, the identifier 5, and the identifier 12. When an exception occurs in the AMF entity 1 that serves a terminal whose group identifier is the identifier 2, the AMF entity 3 takes over the terminal whose group identifier is the identifier 2, and serves the terminal. When an exception occurs in the AMF entity 2 that serves a terminal whose group identifier is the identifier 5, the AMF entity 3 takes over the terminal whose group identifier is the identifier 5, and serves the terminal. When an exception occurs in the AMF entity 4 that serves a terminal whose group identifier is the identifier 12, the AMF entity 3 takes over the terminal whose group identifier is the identifier 12, and serves the terminal.

When no exception occurs in the AMF entity 4, the AMF entity 4 serves terminals whose group identifiers are the identifier 10, the identifier 11, and the identifier 12, and the AMF entity 4 stores contexts of terminals whose group identifiers are the identifier 3, the identifier 6, and the identifier 9. When an exception occurs in the AMF entity 1 that serves a terminal whose group identifier is the identifier 3, the AMF entity 4 takes over the terminal whose group identifier is the identifier 3, and serves the terminal. When an exception occurs in the AMF entity 2 that serves a terminal whose group identifier is the identifier 6, the AMF entity 4 takes over the terminal whose group identifier is the identifier 6, and serves the terminal. When an exception occurs in the AMF entity 3 that serves a terminal whose group identifier is the identifier 9, the AMF entity 4 takes over the terminal whose group identifier is the identifier 9, and serves the terminal.

Optionally, in the backup relationship shown in Table 1 or Table 2, backup group identifiers of one AMF entity are equally taken over by the other AMF entities in an AMF entity group to which the AMF entity belongs. In an actual network, the backup relationship may be unequal. For example, if a capacity of the AMF entity 3 equals two times that of the AMF entity 2, and equals two times that of the AMF entity 1, a configured backup relationship may be shown in Table 3.

TABLE 3

| Name of an AMF entity | Serving group identifier | Backup group identifier |
|---|---|---|
| AMF entity 1 | Identifier 1, identifier 2, and identifier 3 | Identifier 7, identifier 8, and identifier 9 |
| AMF entity 2 | Identifier 4, identifier 5, and identifier 6 | Identifier 10, identifier 11, and identifier 12 |
| AMF entity 3 | Identifier 7, identifier 8, identifier 9, identifier 10, identifier 11, and identifier 12 | Identifier 1, identifier 2, identifier 3, identifier 4, identifier 5, and identifier 6 |

Therefore, when no exception occurs in the AMF entity 1, the AMF entity 1 serves terminals whose group identifiers are the identifier 1, the identifier 2, and the identifier 3, and the AMF entity 1 stores contexts of terminals whose group identifiers are the identifier 7, the identifier 8, and the identifier 9. When an exception occurs in the AMF entity 3 that serves the terminals whose group identifiers are the identifier 7, the identifier 8, and the identifier 9, the AMF entity 1 takes over the terminals whose group identifiers are the identifier 7, the identifier 8, and the identifier 9, and serves these terminals.

When no exception occurs in the AMF entity 2, the AMF entity 2 serves terminals whose group identifiers are the identifier 4, the identifier 5, and the identifier 6, and the AMF entity 2 stores contexts of terminals whose group identifiers are the identifier 10, the identifier 11, and the identifier 12. When an exception occurs in the AMF entity 3 that serves the terminals whose group identifiers are the identifier 10, the identifier 11, and the identifier 12, the AMF entity 2 takes over the terminals whose group identifiers are the identifier 10, the identifier 11, and the identifier 12, and serves these terminals.

When no exception occurs in the AMF entity 3, the AMF entity 3 serves the terminals whose group identifiers are the identifier 7, the identifier 8, the identifier 9, the identifier 10, the identifier 11, and the identifier 12, and the AMF entity 3 stores contexts of terminals whose group identifiers are the identifier 1, the identifier 2, the identifier 3, the identifier 4, the identifier 5, and the identifier 6. When an exception occurs in the AMF entity 1 that serves the terminals whose group identifiers are the identifier 1, the identifier 2, and the identifier 3, the AMF entity 3 takes over the terminals whose group identifiers are the identifier 1, the identifier 2, and the identifier 3, and serves these terminals. When an exception occurs in the AMF entity 2 that serves the terminals whose group identifiers are the identifier 4, the identifier 5, and the identifier 6, the AMF entity 3 takes over the terminals whose group identifiers are the identifier 4, the identifier 5, and the identifier 6, and serves these terminals.

A backup relationship between AMF entities in the AMF entity group is not specifically limited in the embodiments of this application, and may be flexibly configured based on an actual requirement.

Optionally, in the embodiments of this application, alternatively, serving group identifiers and backup group identifiers may not be configured in an AMF entity at the same time, but only group identifiers of terminals that are served by a serving AMF entity when no exception occurs in the serving AMF entity, and information about backup AMF entities that respectively take over terminals whose group identifiers are these group identifiers when an exception occurs in the serving AMF entity, are configured in the serving AMF entity. For example, assuming that a backup relationship between two AMF entities in an AMF entity group is shown in Table 1, the backup relationship may alternatively be represented by Table 4.

TABLE 4

| Name of a serving AMF entity | Group identifier | Name of a backup AMF entity |
|---|---|---|
| AMF entity 1 | Identifier 1, identifier 2, and identifier 3 | AMF entity 2 |
| AMF entity 2 | Identifier 4, identifier 5, and identifier 6 | AMF entity 1 |

Alternatively, for example, assuming that a backup relationship between four AMF entities in an AMF entity group is shown in Table 2, the backup relationship may alternatively be represented by Table 5.

TABLE 5

| Name of a serving AMF entity | Group identifier | Name of a serving AMF entity |
|---|---|---|
| AMF entity 1 | Identifier 1 | AMF entity 2 |
|  | Identifier 2 | AMF entity 3 |
|  | Identifier 3 | AMF entity 4 |
| AMF entity 2 | Identifier 4 | AMF entity 1 |
|  | Identifier 5 | AMF entity 3 |
|  | Identifier 6 | AMF entity 4 |
| AMF entity 3 | Identifier 7 | AMF entity 1 |
|  | Identifier 8 | AMF entity 2 |
|  | Identifier 9 | AMF entity 4 |
| AMF entity 4 | Identifier 10 | AMF entity 1 |
|  | Identifier 11 | AMF entity 2 |
|  | Identifier 12 | AMF entity 3 |

Alternatively, for example, assuming that a backup relationship between four AMF entities in an AMF entity group is shown in Table 3, the backup relationship may alternatively be represented by Table 6.

TABLE 6

| Name of a serving AMF entity | Group identifier | Name of a serving AMF entity |
|---|---|---|
| AMF entity 1 | Identifier 1 | AMF entity 3 |
|  | Identifier 2 | AMF entity 3 |
|  | Identifier 3 | AMF entity 3 |
| AMF entity 2 | Identifier 4 | AMF entity 3 |
|  | Identifier 5 | AMF entity 3 |
|  | Identifier 6 | AMF entity 3 |
| AMF entity 3 | Identifier 7 | AMF entity 1 |
|  | Identifier 8 | AMF entity 1 |
|  | Identifier 9 | AMF entity 1 |
| AMF entity 4 | Identifier 10 | AMF entity 2 |
|  | Identifier 11 | AMF entity 2 |
|  | Identifier 12 | AMF entity 2 |

A representation form of the backup relationship between AMF entities in the AMF entity group is not specifically limited in the embodiments of this application.

Next, for example, the communications system shown in FIG. 1 is applied to the 5G network shown in FIG. 2, and a configuration status of an AMF entity group is shown in Table 2. Assuming that the AMF entity 1 is a first AMF entity, the AMF entity 2 is a second AMF entity, the AMF entity 3 is a third AMF entity, and that the AMF entity 4 is a fourth AMF entity. A communication method provided in an embodiment of this application may be shown in FIG. 4A, FIG. 4B, and FIG. 4C, and includes the following steps.

S401*a*. The first AMF entity sends, to an access device, serving group identifiers configured in the first AMF entity, such that the access device receives the serving group identifiers configured in the first AMF entity from the first AMF entity.

It can be learned with reference to Table 2 that, the serving group identifiers configured in the first AMF entity include the identifier 1, the identifier 2, and the identifier 3. The serving group identifiers are used to indicate that terminals in corresponding terminal groups are served by the first AMF entity.

Optionally, after receiving the serving group identifiers configured in the first AMF entity, the access device may store a correspondence between information about the first AMF entity and the serving group identifiers configured in the first AMF entity. In this way, the access device may subsequently select a corresponding AMF entity based on the correspondence. This is not specifically limited in this embodiment of this application.

S401*b*. The second AMF entity sends, to the access device, serving group identifiers configured in the second AMF entity, such that the access device receives the serving group identifiers configured in the second AMF entity from the second AMF entity.

It can be learned with reference to Table 2 that, the serving group identifiers configured in the second AMF entity include the identifier 4, the identifier 5, and the identifier 6. The serving group identifiers are used to indicate that terminals in corresponding terminal groups are served by the second AMF entity.

Optionally, after receiving the serving group identifiers configured in the second AMF entity, the access device may store a correspondence between information about the second AMF entity and the serving group identifiers configured in the second AMF entity. In this way, the access device may subsequently select a corresponding AMF entity based on the correspondence. This is not specifically limited in this embodiment of this application.

S401*c*. The third AMF entity sends, to the access device, serving group identifiers configured in the third AMF entity, such that the access device receives the serving group identifiers configured in the third AMF entity from the third AMF entity.

It can be learned with reference to Table 2 that, the serving group identifiers configured in the third AMF entity include the identifier 7, the identifier 8, and the identifier 9. The serving group identifiers are used to indicate that terminals in corresponding terminal groups are served by the third mobility management entity.

Optionally, after receiving the serving group identifiers configured in the third AMF entity, the access device may store a correspondence between information about the third AMF entity and the serving group identifiers configured in the third AMF entity. In this way, the access device may subsequently select a corresponding AMF entity based on the correspondence. This is not specifically limited in this embodiment of this application.

S401*d*. The fourth AMF entity sends, to the access device, serving group identifiers configured in the fourth AMF entity, such that the access device receives the serving group identifiers configured in the fourth AMF entity from the fourth AMF entity.

It can be learned with reference to Table 2 that, the serving group identifiers configured in the fourth AMF entity include the identifier 10, the identifier 11, and the identifier 12. The serving group identifiers are used to indicate that terminals in corresponding terminal groups are served by the fourth mobility management entity.

Optionally, after receiving the serving group identifiers configured in the fourth AMF entity, the access device may store a correspondence between information about the fourth AMF entity and the serving group identifiers configured in the fourth AMF entity. In this way, the access device may subsequently select a corresponding AMF entity based on the correspondence. This is not specifically limited in this embodiment of this application.

Optionally, as described above, in steps S401*a* to S401*d*, if a length of the serving group identifiers is not fixed, each AMF entity further needs to notify the access device of the length of the serving group identifiers. The length of the serving group identifiers may be expressed in a quantity of bits, or may be represented using a mask. This is not specifically limited in this embodiment of this application.

Optionally, in this embodiment of this application, the first AMF entity may further send, to an SMF entity, the serving group identifiers configured in the first AMF entity.

The second AMF entity may further send, to the SMF entity, the serving group identifiers configured in the second AMF entity. The third AMF entity may further send, to the SMF entity, the serving group identifiers configured in the third AMF entity, and the fourth AMF entity may further send, to the SMF entity, the serving group identifiers configured in the fourth AMF entity. In this way, the SMF entity may store a correspondence between information about each AMF entity and serving group identifiers configured in the corresponding AMF entity, such that the SMF entity can subsequently select a corresponding AMF entity based on the correspondence. Certainly, a group identifier of a terminal and information about an AMF entity that serves the terminal may also be sent to the SMF entity during packet data unit (PDU) session establishment. This is not specifically limited in this embodiment of this application.

S402. A terminal registers with a network.

For example, when the terminal accesses the AMF entity group for the first time, a globally unique temporary identity (GUTI) of the terminal does not include a group identifier of the terminal. In this case, the access device selects an AMF entity for the terminal. This embodiment of this application is described using an example in which the terminal registers with the first AMF entity. Therefore, when the first AMF entity receives a registration request of the terminal, the first AMF entity randomly selects, as the group identifier of the terminal, one serving group identifier from the serving group identifiers configured in the first AMF entity.

Optionally, assuming that the first AMF entity selects the identifier 1 as the group identifier of the terminal, the first AMF entity continues to perform step S403a.

Alternatively, assuming that the first AMF entity selects the identifier 2 as the group identifier of the terminal, the first AMF entity continues to perform step S403b.

Alternatively, assuming that the first AMF entity selects the identifier 3 as the group identifier of the terminal, the first AMF entity continues to perform step S403c.

S403a. The first AMF entity sends a context of the terminal to the second AMF entity after the terminal finishes registration or at another moment, for example, when a timer expires, such that the second AMF entity receives the context of the terminal from the first AMF entity.

It can be learned with reference to Table 2 that, backup group identifiers configured in the second AMF entity include the identifier 1. In other words, when an exception occurs in the first AMF entity that serves a terminal whose group identifier is the identifier 1, the second AMF entity may take over the terminal, and serve the terminal whose group identifier is the identifier 1. Therefore, the first AMF entity needs to synchronize a context of the terminal whose group identifier is the identifier 1 to the second AMF entity.

S403b. The first AMF entity sends a context of the terminal to the third AMF entity after the terminal finishes registration or at another moment, for example, when a timer expires, such that the third AMF entity receives the context of the terminal from the first AMF entity.

It can be learned with reference to Table 2 that, backup group identifiers configured in the third AMF entity include the identifier 2. In other words, when an exception occurs in the first AMF entity that serves a terminal whose group identifier is the identifier 2, the third AMF entity may take over the terminal, and serve the terminal whose group identifier is the identifier 2. Therefore, the first AMF entity needs to synchronize a context of the terminal whose group identifier is the identifier 2 to the third AMF entity.

S403c. The first AMF entity sends a context of the terminal to the fourth AMF entity after the terminal finishes registration or at another moment, for example, when a timer expires, such that the fourth AMF entity receives the context of the terminal from the first AMF entity.

It can be learned with reference to Table 2 that, backup group identifiers configured in the fourth AMF entity include the identifier 3. In other words, when an exception occurs in the first AMF entity that serves a terminal whose group identifier is the identifier 3, the fourth AMF entity may take over the terminal, and serve the terminal whose group identifier is the identifier 4. Therefore, the first AMF entity needs to synchronize a context of the terminal whose group identifier is the identifier 3 to the fourth AMF entity.

S404. An exception occurs in the first AMF entity.

When the exception occurs in the first AMF entity, the access device performs steps S405a and S406a, the second AMF entity performs steps S405b to S407b, the third AMF entity performs steps S405c to S407c, the fourth AMF entity performs steps S405d to S407d, and the SMF entity performs steps S405e and S406e. For details, refer to the following steps.

S405a. The access device detects that the exception occurs in the first AMF entity.

S406a. The access device marks the first AMF entity as unavailable, and no longer selects the first AMF entity when a new terminal accesses the network subsequently.

S405b. The second AMF entity detects that the exception occurs in the first AMF entity.

S406b. The second AMF entity sends an indication message 1 to an SMF entity, such that the SMF entity receives the indication message 1 from the second AMF entity. The indication message 1 is used to indicate that a terminal in a terminal group corresponding to the identifier 1 is served by the second AMF entity.

Optionally, after receiving the indication message 1, the SMF entity may store a correspondence between the information about the second AMF entity and the identifier 1. In addition, for a terminal whose group identifier is the identifier 1 and that establishes a PDU session on the SMF entity, the SMF entity may release an N11 interface between the SMF entity and the first AMF entity. In this way, when the SMF entity needs to send a downlink message subsequently, the SMF entity may select the second AMF entity based on the correspondence, establish an N11 interface between the SMF entity and the second AMF entity, and send the downlink message using the second AMF entity. This is not specifically limited in this embodiment of this application.

S407b. The second AMF entity sends the indication message 1 to the access device, such that the access device receives the indication message 1 from the second AMF entity. The indication message 1 is used to indicate that the terminal in the terminal group corresponding to the identifier 1 is served by the second AMF entity.

Optionally, after receiving the indication message 1, the access device may store the correspondence between the information about the second AMF entity and the identifier 1. In addition, for a terminal whose group identifier is the identifier 1 and that is in a connected state, the access device may release an N2 interface between the access device and the first AMF entity. In this way, when the access device needs to send an uplink message subsequently, the access device may select the second AMF entity based on the correspondence, establish an N2 interface between the access device and the second AMF entity, and send the uplink message using the second AMF entity. This is not specifically limited in this embodiment of this application.

S405c. The third AMF entity detects that the exception occurs in the first AMF entity.

S406c. The third AMF entity sends an indication message 2 to the SMF entity, such that the SMF entity receives the indication message 2 from the third AMF entity. The indication message 2 is used to indicate that a terminal in a terminal group corresponding to the identifier 2 is served by the third AMF entity.

Optionally, after receiving the indication message 2, the SMF entity may store a correspondence between the information about the third AMF entity and the identifier 2. In addition, for a terminal whose group identifier is the identifier 2 and that establishes a PDU session on the SMF entity, the SMF entity may release the N11 interface between the SMF entity and the first AMF entity. In this way, when the SMF entity needs to send a downlink message subsequently, the SMF entity may select the third AMF entity based on the correspondence, establish an N11 interface between the SMF entity and the third AMF entity, and send the downlink message using the third AMF entity. This is not specifically limited in this embodiment of this application.

S407c. The third AMF entity sends the indication message 2 to the access device, such that the access device receives the indication message 2 from the third AMF entity. The indication message 2 is used to indicate that the terminal in the terminal group corresponding to the identifier 2 is served by the third AMF entity.

Optionally, after receiving the indication message 2, the access device may store the correspondence between the information about the third AMF entity and the identifier 2. In addition, for a terminal whose group identifier is the identifier 2 and that is in a connected state, the access device may release an N2 interface between the access device and the first AMF entity. In this way, when the access device needs to send an uplink message subsequently, the access device may select the third AMF entity based on the correspondence, establish an N2 interface between the access device and the third AMF entity, and send the uplink message using the third AMF entity. This is not specifically limited in this embodiment of this application.

S405d. The fourth AMF entity detects that the exception occurs in the first AMF entity.

S406d. The fourth AMF entity sends an indication message 3 to the SMF entity, such that the SMF entity receives the indication message 3 from the fourth AMF entity. The indication message 3 is used to indicate that a terminal in a terminal group corresponding to the identifier 3 is served by the fourth AMF entity.

Optionally, after receiving the indication message 3, the SMF entity may store a correspondence between the information about the fourth AMF entity and the identifier 3. In addition, for a terminal whose group identifier is the identifier 3 and that establishes a PDU session on the SMF entity, the SMF entity may release the N11 interface between the SMF entity and the first AMF entity. In this way, when the SMF entity needs to send a downlink message subsequently, the SMF entity may select the fourth AMF entity based on the correspondence, establish an N11 interface between the SMF entity and the fourth AMF entity, and send the downlink message using the fourth AMF entity. This is not specifically limited in this embodiment of this application.

S406d. The fourth AMF entity sends the indication message 3 to the access device, such that the access device receives the indication message 3 from the fourth AMF entity. The indication message 3 is used to indicate that a terminal in a terminal group corresponding to the identifier 3 is served by the fourth AMF entity.

Optionally, after receiving the indication message 3, the access device may store the correspondence between the information about the fourth AMF entity and the identifier 3. In addition, for a terminal whose group identifier is the identifier 3 and that is in a connected state, the access device may release an N2 interface between the access device and the first AMF entity. In this way, when the access device needs to send an uplink message subsequently, the access device may select the fourth AMF entity based on the correspondence, establish an N2 interface between the access device and the fourth AMF entity, and send the uplink message using the fourth AMF entity. This is not specifically limited in this embodiment of this application.

S405e. The SMF entity detects that the exception occurs in the first AMF entity.

S406e. The SMF entity marks the first AMF entity as unavailable, and no longer sends a downlink message to the first AMF entity subsequently.

It should be noted that, this embodiment of this application is described using only interaction between each AMF entity and the SMF entity on a core network side. Certainly, the SMF entity in this embodiment of this application may also be replaced with another core network device. For example, each AMF entity performs the foregoing interaction with a UDM entity or an AUSF entity. This is not specifically limited in this embodiment of this application.

The following provides descriptions separately from two aspects: the access device obtains an uplink message related to the terminal and the SMF entity obtains a downlink message related to the terminal, which respectively include the following steps S408 and S409 and steps S410 and S411.

S408. The access device obtains an uplink message related to the terminal.

Optionally, in this embodiment of this application, the uplink message related to the terminal may be an uplink message, such as an uplink N2 message, that is sent to a target AMF entity when the access device needs to initiate an N2 message related to the terminal. Alternatively, the uplink message related to the terminal may be an uplink message, such as an uplink non-access stratum (NAS) message, that is sent by the terminal to the target AMF entity. This is not specifically limited in this embodiment of this application.

The access device may obtain the group identifier of the terminal from the uplink message related to the terminal that is sent by the terminal to the access device; or the access device may determine the group identifier of the terminal from the context of the terminal. This is not specifically limited in this embodiment of this application.

Optionally, if the uplink message related to the terminal includes a system architecture evolution (SAE) temporary mobile subscriber identity (S-TMSI), because the S-TMSI includes an AMF pointer and a terminal temporary identifier, and if the group identifier of the terminal group is the AMF pointer and highest N bits of the terminal temporary identifier, the access device may read a quantity of bits of a corresponding length from highest bits of the S-TMSI based on a length of the group identifier, to obtain the corresponding group identifier. This is not specifically limited in this embodiment of this application.

Optionally, assuming that the group identifier of the terminal is the identifier 1, the access device continues to perform step S409a.

Alternatively, assuming that the group identifier of the terminal is the identifier 2, the access device continues to perform step S409b.

Alternatively, assuming that the group identifier of the terminal is the identifier 3, the access device continues to perform step S409c.

S409a. The access device sends the uplink message related to the terminal to the second AMF entity based on the group identifier 1, such that the second AMF entity receives the uplink message related to the terminal from the access device.

Optionally, the access device may determine, based on the indication message 1 received in step S407b and the group identifier 1 obtained in step S408, that an AMF entity corresponding to the group identifier 1 is the second AMF entity, to send the uplink message related to the terminal to the second AMF entity.

S409b. The access device sends the uplink message related to the terminal to the third AMF entity based on the group identifier 2, such that the third AMF entity receives the uplink message related to the terminal from the access device.

Optionally, the access device may determine, based on the indication message 2 received in step S407c and the group identifier 2 obtained in step S408, that an AMF entity corresponding to the group identifier 2 is the third AMF entity, to send the uplink message related to the terminal to the third AMF entity.

S409c. The access device sends the uplink message related to the terminal to the fourth AMF entity based on the group identifier 3, such that the fourth AMF entity receives the uplink message related to the terminal from the access device.

Optionally, the access device may determine, based on the indication message 3 received in step S407d and the group identifier 3 obtained in step S408, that an AMF entity corresponding to the group identifier 3 is the fourth AMF entity, to send the uplink message related to the terminal to the fourth AMF entity.

S410. The SMF entity obtains a downlink message related to the terminal.

Optionally, in this embodiment of this application, the downlink message related to the terminal may be a downlink message, such as a downlink N2 message, that is sent by the SMF entity to the access device. Alternatively, the downlink message related to the terminal may be a downlink message, such as a downlink NAS message, that is sent by the SMF entity to the terminal, or may be a downlink message sent by the SMF entity to the target AMF entity. This is not specifically limited in this embodiment of this application.

Optionally, the SMF entity may obtain the group identifier of the terminal from the downlink message related to the terminal that is sent by another device to the SMF entity. Alternatively, the SMF entity may determine the group identifier of the terminal from the context of the terminal. This is not specifically limited in this embodiment of this application.

Optionally, if the downlink message related to the terminal includes an S-TMSI, because the S-TMSI includes an AMF pointer and a terminal temporary identifier, and if the group identifier of the terminal group is the AMF pointer and highest N bits of the terminal temporary identifier, the SMF entity may read a value of a corresponding quantity of bits from highest bits of the S-TMSI based on a length of the group identifier, to obtain the corresponding group identifier. This is not specifically limited in this embodiment of this application.

Optionally, assuming that the group identifier of the terminal is the identifier 1, the SMF entity continues to perform step S411a.

Alternatively, assuming that the group identifier of the terminal is the identifier 2, the SMF entity continues to perform step S411b.

Alternatively, assuming that the group identifier of the terminal is the identifier 3, the SMF entity continues to perform step S411c.

S411a. The SMF entity sends the downlink message related to the terminal to the second AMF entity based on the group identifier 1, such that the second AMF entity receives the downlink message related to the terminal from the SMF entity.

Optionally, the SMF entity may determine, based on the indication message 1 received in step S406b and the group identifier 1 obtained in step S410, that an AMF entity corresponding to the group identifier 1 is the second AMF entity, to send the downlink message related to the terminal to the second AMF entity.

S411b. The SMF entity sends the downlink message related to the terminal to the third AMF entity based on the group identifier 2, such that the third AMF entity receives the downlink message related to the terminal from the SMF entity.

Optionally, the SMF entity may determine, based on the indication message 2 received in step S406c and the group identifier 2 obtained in step S410, that an AMF entity corresponding to the group identifier 2 is the third AMF entity, to send the downlink message related to the terminal to the third AMF entity.

S411c. The SMF entity sends the downlink message related to the terminal to the fourth AMF entity based on the group identifier 3, such that the fourth AMF entity receives the downlink message related to the terminal from the SMF entity.

Optionally, the SMF entity may determine, based on the indication message 3 received in step S406d and the group identifier 3 obtained in step S410, that an AMF entity corresponding to the group identifier 3 is the fourth AMF entity, to send the downlink message related to the terminal to the fourth AMF entity.

According to the communication method provided in this embodiment of this application, because the first AMF entity may synchronize a context of a served terminal to another AMF entity in which a group identifier of the terminal is configured, when an exception occurs in the first AMF entity, a message related to the terminal may be sent, based on the group identifier, to the other AMF entity in which the group identifier is configured. Therefore, when the exception occurs in the first mobility management entity, a case in which a re-registration process of the terminal that is being served is triggered because the context of the terminal is lost can be avoided; in other words, a current process of the terminal that is being served can remain uninterrupted. In addition, because the first AMF entity may group terminals, contexts of terminals in different terminal groups may be respectively backed up to a plurality of different AMF entities. In other words, one-to-many backup may be implemented. In this way, when the exception occurs in the first AMF entity, the plurality of different AMF entities separately takes over one or more terminal groups of the first AMF entity. Therefore, impact on a single AMF entity due to the exception of the first AMF entity is reduced, resources are saved compared with conventional 1+1 backup, and a problem that a context in an MME pool in a conventional system is lost is resolved.

All actions of the access device, the SMF entity, and each AMF entity in steps S401 to S411 may be performed by the processor 301 in the network device 300 shown in FIG. 3 by invoking the application program code stored in the memory 303. This is not limited in this embodiment of this application.

Optionally, for example, the communications system shown in FIG. 1 is applied to the 5G network shown in FIG. 2, and a configuration status of an AMF entity group is shown in Table 2. Assuming that the AMF entity 1 is a first AMF entity, the AMF entity 2 is a second AMF entity, the AMF entity 3 is a third AMF entity, and the AMF entity 4 is a fourth AMF entity, a communication method provided in an embodiment of this application may alternatively be shown in FIG. 5A, FIG. 5B, and FIG. 5C, and include the following steps.

Figure 4A:
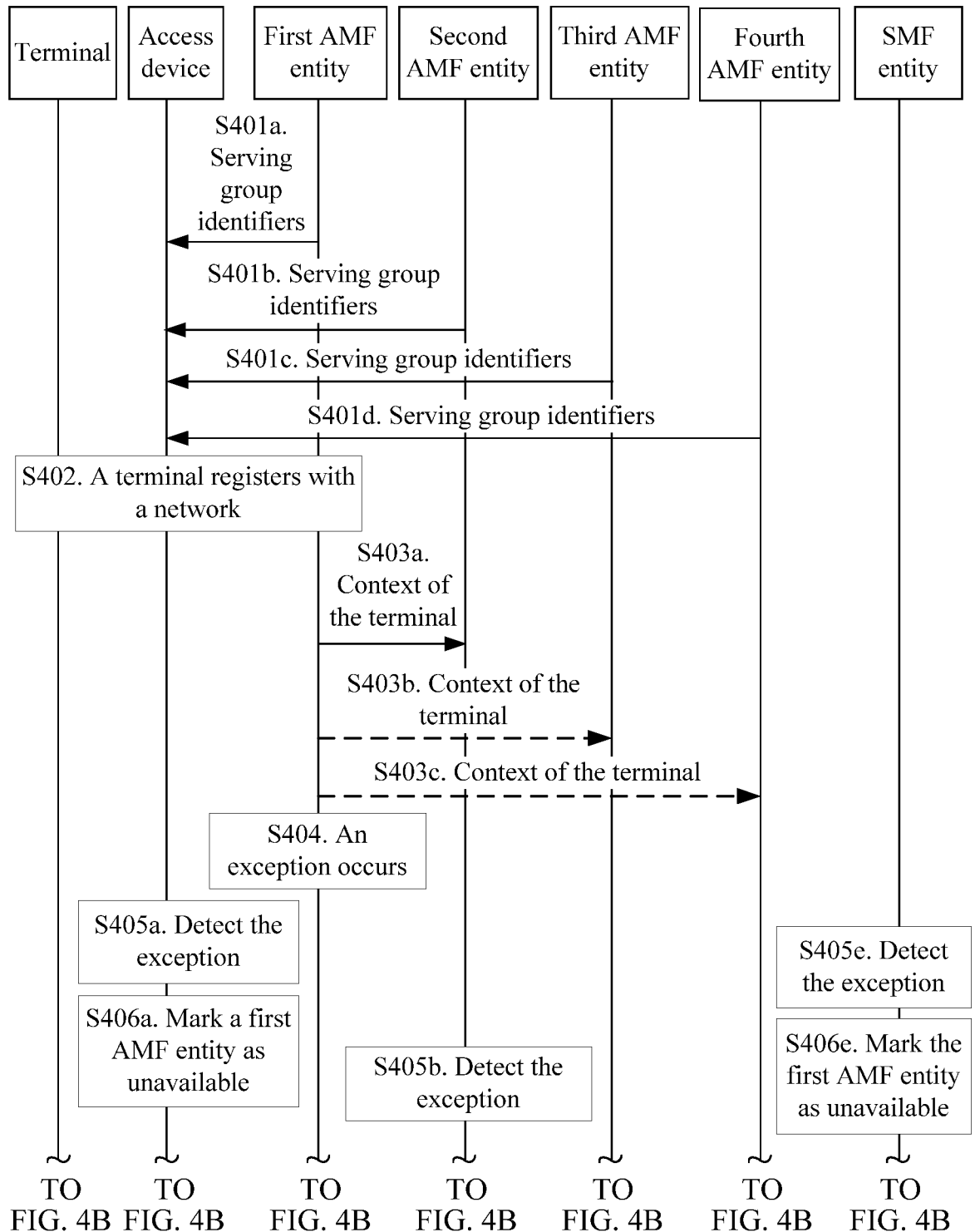
FIG. 4A, FIG. 4B, and FIG. 4C are schematic flowcharts 1 of a communication method according to an embodiment of this application.
Figure 4B:
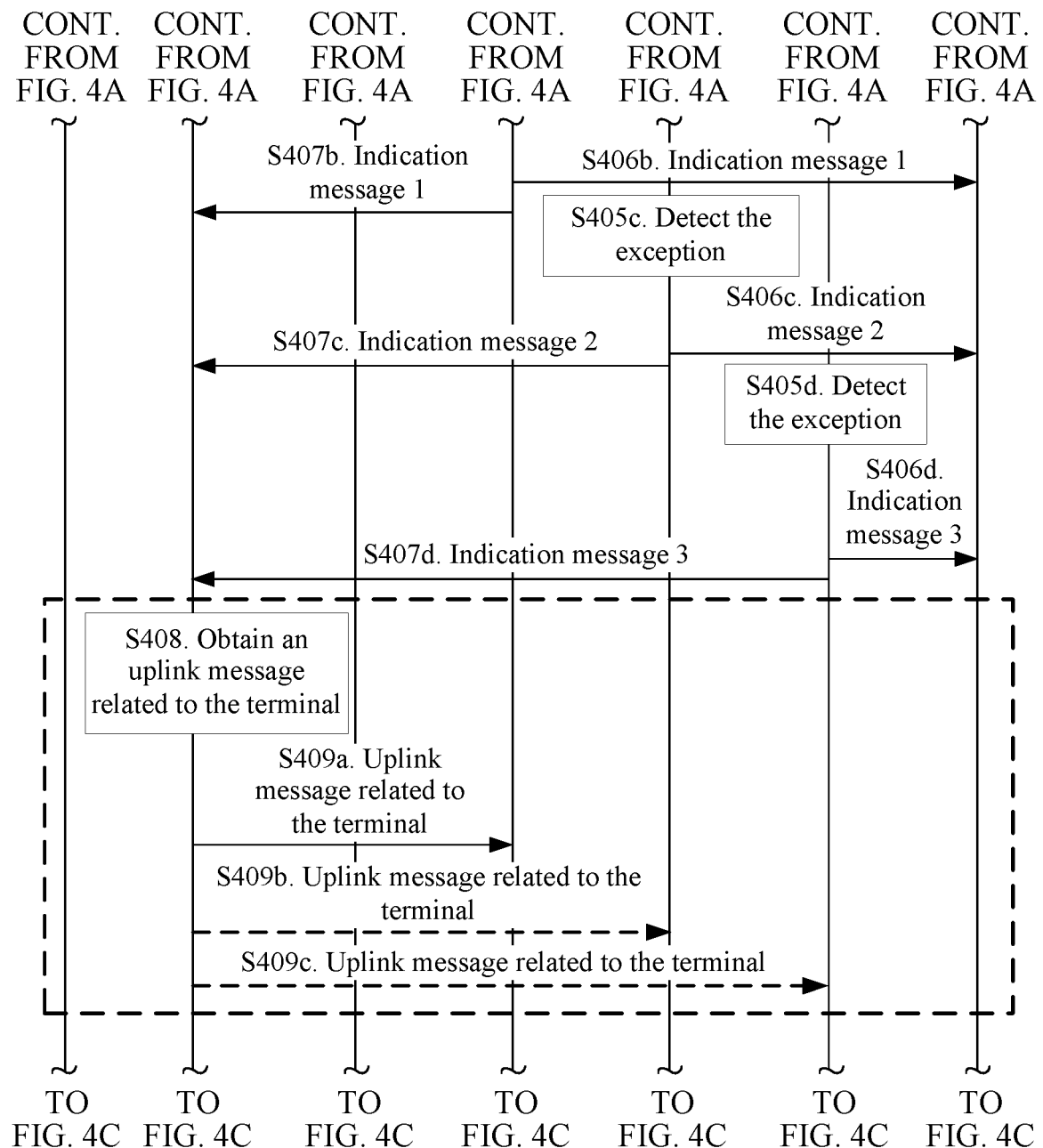
Figure 4C:
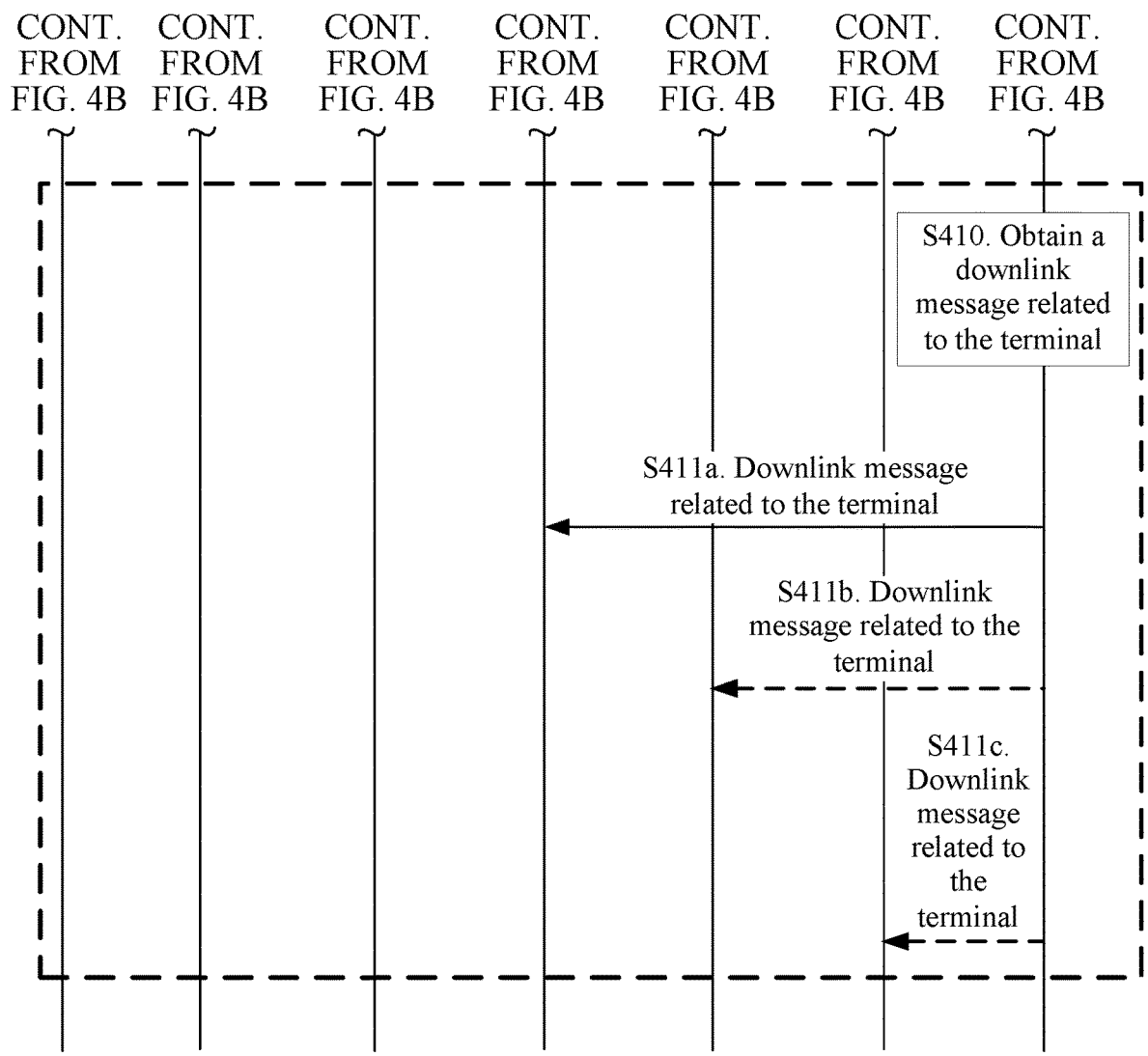
Figure 5A:
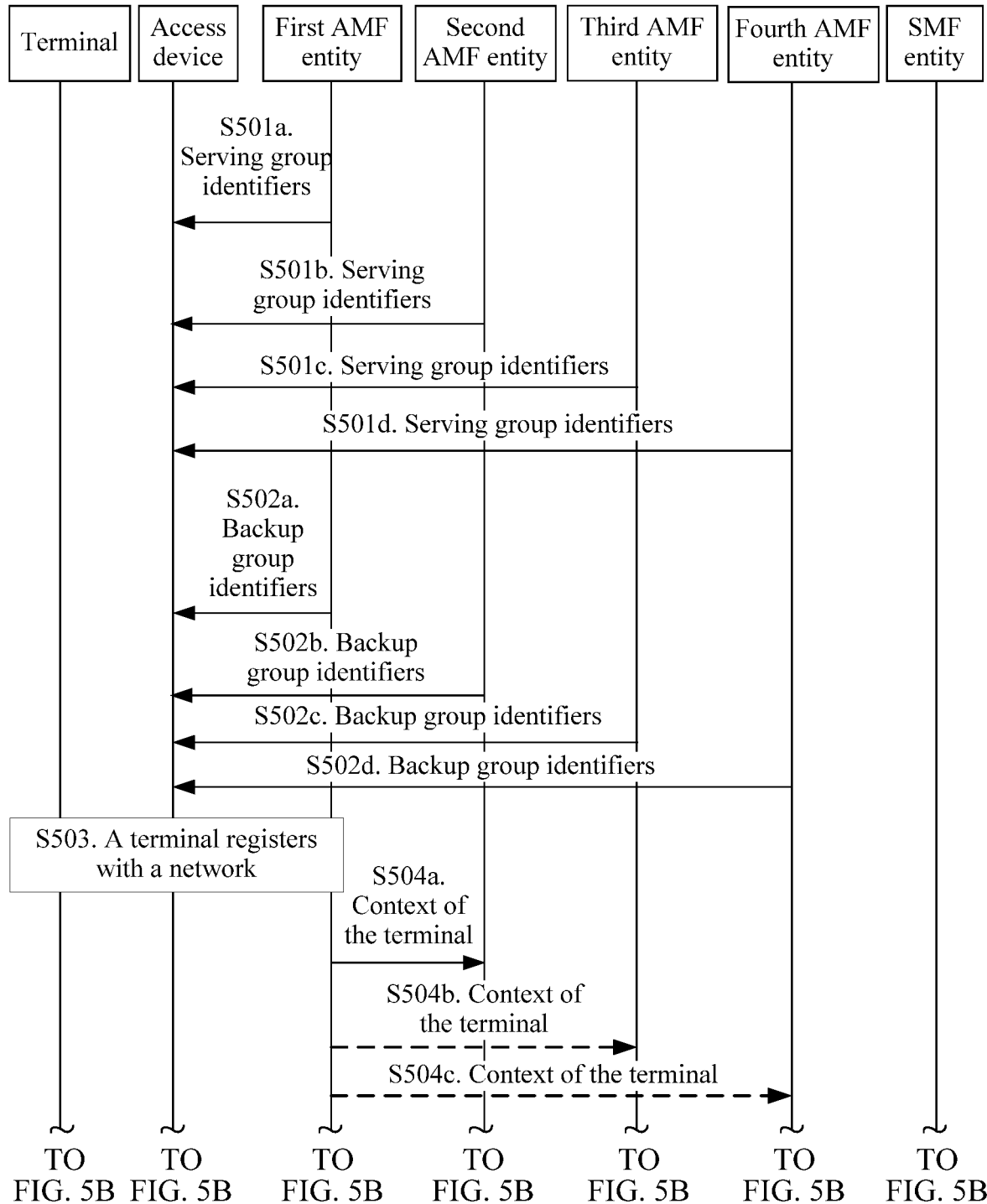
FIG. 5A, FIG. 5B, and FIG. 5C are schematic flowcharts 2 of a communication method according to an embodiment of this application.
Figure 5B:
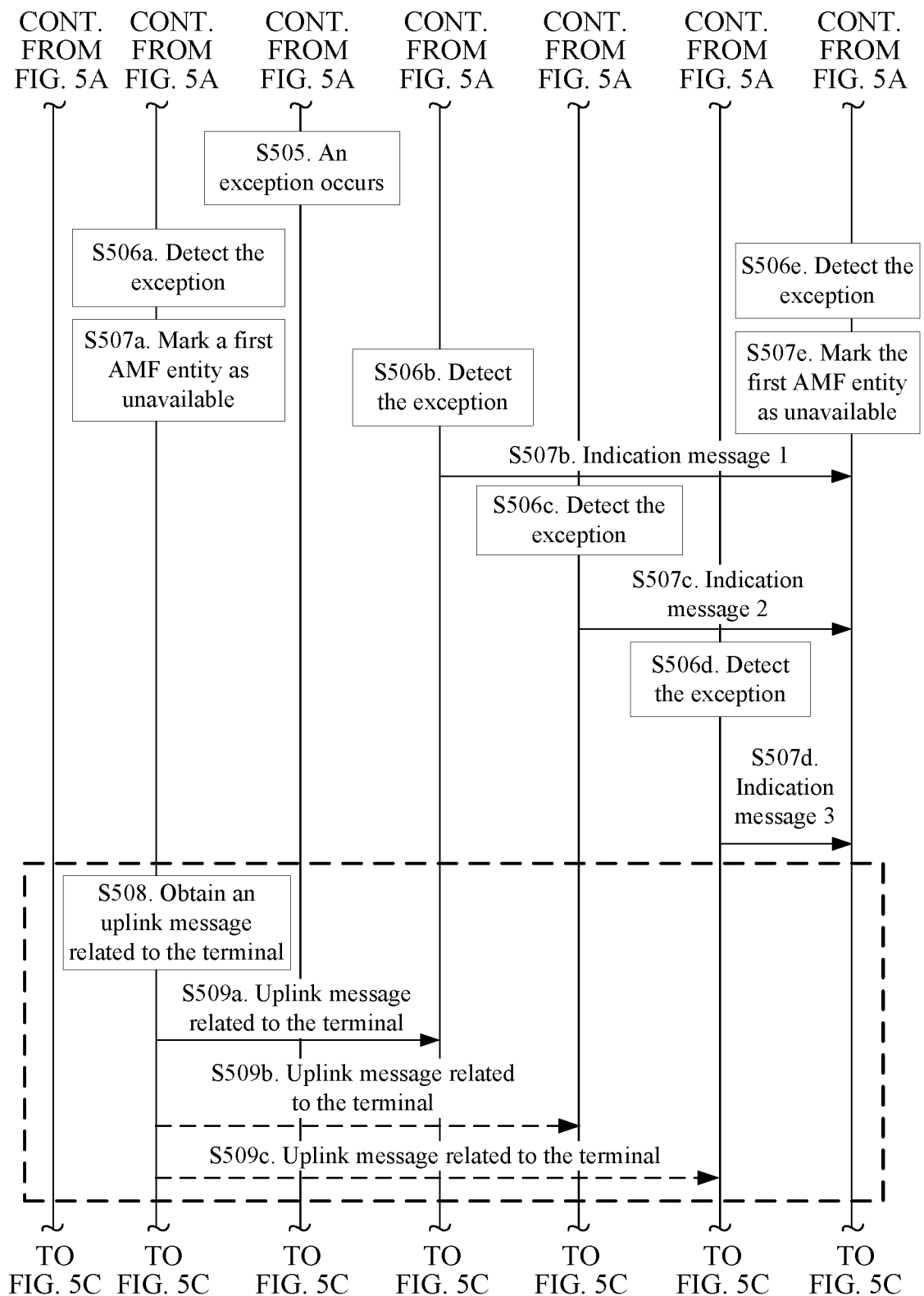
Figure 5C:
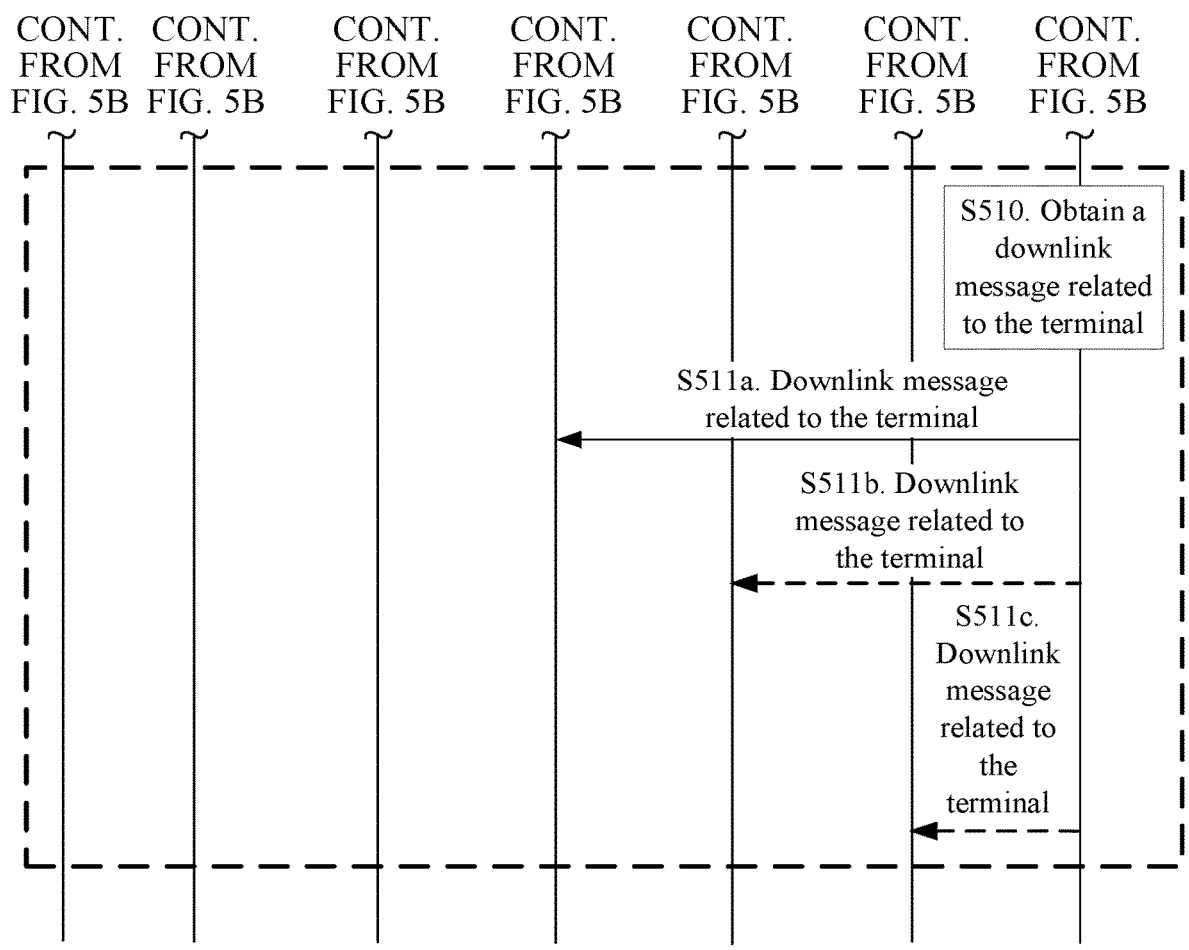

S501a to S501d are similar to S401a to S401d, and a difference only lies in that, the serving group identifiers in the embodiment shown in FIG. 4A, FIG. 4B, and FIG. 4C are used to indicate that terminals in corresponding terminal groups are served by an AMF entity that sends the serving group identifiers, while serving group identifiers in the embodiment shown in FIG. 5A, FIG. 5B, and FIG. 5C are used to indicate that when no exception occurs in an AMF entity that sends the serving group identifiers, terminals in corresponding terminal groups are served by the first AMF entity. Refer to the embodiment shown in FIG. 4A, FIG. 4B, and FIG. 4C for details, and the details are not described herein again.

S502a. The first AMF entity sends, to the access device, backup group identifiers configured in the first AMF entity, such that the access device receives the backup group identifiers configured in the first AMF entity from the first AMF entity.

It can be learned with reference to Table 2 that, the backup group identifiers configured in the first AMF entity include the identifier 4, the identifier 7, and the identifier 10. The backup group identifier is used to indicate that when an exception occurs in an AMF entity in which the backup group identifier is configured as a serving group identifier, a terminal in a corresponding terminal group is served by the first AMF entity. For example, when an exception occurs in the second AMF entity in which the identifier 4 is configured as a serving group identifier, a terminal in a terminal group whose group identifier is the identifier 4 is served by the first AMF entity.

Optionally, after receiving the backup group identifiers configured in the first AMF entity, the access device may store a correspondence between information about the first AMF entity and the backup group identifiers configured in the first AMF entity. In this way, the access device may subsequently select a corresponding AMF entity based on the correspondence. This is not specifically limited in this embodiment of this application.

S502b. The second AMF entity sends, to the access device, backup group identifiers configured in the second AMF entity, such that the access device receives the backup group identifiers configured in the second AMF entity from the second AMF entity.

It can be learned with reference to Table 2 that, the backup group identifiers configured in the second AMF entity include the identifier 1, the identifier 8, and the identifier 11. The backup group identifier is used to indicate that when an exception occurs in an AMF entity in which the backup group identifier is configured as a serving group identifier, a terminal in a corresponding terminal group is served by the second AMF entity. For example, when an exception occurs in the first AMF entity in which the identifier 1 is configured as a serving group identifier, a terminal in a terminal group whose group identifier is the identifier 1 is served by the second AMF entity.

Optionally, after receiving the backup group identifiers configured in the second AMF entity, the access device may store a correspondence between information about the second AMF entity and the backup group identifiers configured in the second AMF entity. In this way, the access device may subsequently select a corresponding AMF entity based on the correspondence. This is not specifically limited in this embodiment of this application.

S502c. The third AMF entity sends, to the access device, backup group identifiers configured in the third AMF entity, such that the access device receives the backup group identifiers configured in the third AMF entity from the third AMF entity.

It can be learned with reference to Table 2 that, the backup group identifiers configured in the third AMF entity include the identifier 2, the identifier 5, and the identifier 12. The backup group identifier is used to indicate that when an exception occurs in an AMF entity in which the backup group identifier is configured as a serving group identifier, a terminal in a corresponding terminal group is served by the third AMF entity. For example, when an exception occurs in the first AMF entity in which the identifier 2 is configured as a serving group identifier, a terminal in a terminal group whose group identifier is the identifier 2 is served by the third AMF entity.

Optionally, after receiving the backup group identifiers configured in the third AMF entity, the access device may store a correspondence between information about the third AMF entity and the backup group identifiers configured in the third AMF entity. In this way, the access device may subsequently select a corresponding AMF entity based on the correspondence. This is not specifically limited in this embodiment of this application.

S502d. The fourth AMF entity sends, to the access device, backup group identifiers configured in the fourth AMF entity, such that the access device receives the backup group identifiers configured in the fourth AMF entity from the fourth AMF entity.

It can be learned with reference to Table 2 that, the backup group identifiers configured in the fourth AMF entity include the identifier 3, the identifier 6, and the identifier 9. The backup group identifier is used to indicate that when an exception occurs in an AMF entity in which the backup group identifier is configured as a serving group identifier, a terminal in a corresponding terminal group is served by the fourth AMF entity. For example, when an exception occurs in the first AMF entity in which the identifier 3 is configured as a serving group identifier, a terminal in a terminal group whose group identifier is the identifier 3 is served by the fourth AMF entity.

Optionally, after receiving the backup group identifiers configured in the fourth AMF entity, the access device may store a correspondence between information about the fourth AMF entity and the backup group identifiers configured in the fourth AMF entity. In this way, the access device may subsequently select a corresponding AMF entity based on the correspondence. This is not specifically limited in this embodiment of this application.

Optionally, as described above, in steps S501a to S502d, if a length of the group identifiers is not fixed, each AMF entity further needs to notify the access device of a length of the serving group identifiers and a length of the backup group identifiers. The length of the serving group identifiers and the length of the backup group identifiers may be expressed in a quantity of bits, or may be represented using a mask. This is not specifically limited in this embodiment of this application.

Optionally, in this embodiment of this application, the serving group identifiers in step S501a and the backup group identifiers in step S502*a* may be carried in one message and sent to the access device together, or may be sent to the access device separately using two messages. This is not specifically limited in this embodiment of this application. Similarly, the serving group identifiers in step S501*b* and the backup group identifiers in step S502*b* may be carried in one message and sent to the access device together, or may be sent to the access device separately using two messages. The serving group identifiers in step S501*c* and the backup group identifiers in step S502*c* may be carried in one message and sent to the access device together, or may be sent to the access device separately using two messages. The serving group identifiers in step S501*d* and the backup group identifiers in step S502*d* may be carried in one message and sent to the access device together, or may be sent to the access device separately using two messages. This is not specifically limited in this embodiment of this application.

Optionally, in this embodiment of this application, the first AMF entity may further send, to an SMF entity, the serving group identifiers and the backup group identifiers that are configured in the first AMF entity. The second AMF entity may further send, to the SMF entity, the serving group identifiers and the backup group identifiers that are configured in the second AMF entity. The third AMF entity may further send, to the SMF entity, the serving group identifiers and the backup group identifiers that are configured in the third AMF entity, and the fourth AMF entity may further send, to the SMF entity, the serving group identifiers and the backup group identifiers that are configured in the fourth AMF entity. In this way, the SMF entity may store a correspondence between information about each AMF entity and serving group identifiers and backup group identifiers configured in the corresponding AMF entity, such that the SMF entity can subsequently select a corresponding AMF entity based on the correspondence. Certainly, a group identifier of a terminal and information about an AMF entity that serves the terminal may also be sent to the SMF entity during PDU session establishment. This is not specifically limited in this embodiment of this application.

S503 is the same as S402. Refer to the embodiment shown in FIG. 4A, FIG. 4B, and FIG. 4C for details, and the details are not described herein again.

S504*a* to S504*c* are the same as S403*a* to S403*c*. Refer to the embodiment shown in FIG. 4A, FIG. 4B, and FIG. 4C for details, and the details are not described herein again.

S505. An exception occurs in the first AMF entity.

When the exception occurs in the first AMF entity, the access device performs steps S506*a* and S507*a*, the second AMF entity performs steps S506*b* and S507*b*, the third AMF entity performs steps S506*c* and S507*c*, the fourth AMF entity performs steps S506*d* and S507*d*, and the SMF entity performs steps S506*e* and S507*e*. For details, refer to the following steps.

S506*a* and S507*a* are the same as S405*a* and S406*a*. Refer to the embodiment shown in FIG. 4A, FIG. 4B, and FIG. 4C for details, and the details are not described herein again.

Optionally, when detecting that the exception occurs in the first AMF entity, the access device may respectively set AMF entities that serve terminals corresponding to the serving group identifiers of the first AMF entity, namely, the identifier 1, the identifier 2, and the identifier 3, to the second AMF entity, the third AMF entity, and the fourth AMF entity based on a correspondence between an AMF entity and backup group identifiers received in 502*a* to 502*d*. This is not specifically limited in this embodiment of this application.

S506*b* and S507*b* are the same as S405*b* and S406*b*. Refer to the embodiment shown in FIG. 4A, FIG. 4B, and FIG. 4C for details, and the details are not described herein again.

S506*c* and S507*c* are the same as S405*c* and S406*c*. Refer to the embodiment shown in FIG. 4A, FIG. 4B, and FIG. 4C for details, and the details are not described herein again.

S506*d* and S507*d* are the same as S405*d* and S406*d*. Refer to the embodiment shown in FIG. 4A, FIG. 4B, and FIG. 4C for details, and the details are not described herein again.

S506*e* and S507*e* are the same as S405*e* and S406*e*. Refer to the embodiment shown in FIG. 4A, FIG. 4B, and FIG. 4C for details, and the details are not described herein again.

It should be noted that, if each AMF entity sends, to the SMF entity before step S503, serving group identifiers and backup group identifiers that are configured in the corresponding AMF entity, steps S506*b* and S507*b*, steps S506*c* and S507*c*, and steps S506*d* and S507*d* may be not performed in this embodiment of this application. This is collectively described herein, and details are not described below again.

Optionally, if each AMF entity sends, to the SMF entity before step S503, serving group identifiers and backup group identifiers that are configured in the corresponding AMF entity, when the SMF entity detects that the exception occurs in the first AMF entity, the SMF entity may respectively set AMF entities that serve terminals corresponding to the serving group identifiers of the first AMF entity, namely, the identifier 1, the identifier 2, and the identifier 3, to the second AMF entity, the third AMF entity, and the fourth AMF entity based on a correspondence between an AMF entity and received serving group identifiers and a correspondence between an AMF entity and backup group identifiers. This is not specifically limited in this embodiment of this application.

The following provides descriptions separately from two aspects: the access device obtains an uplink message related to the terminal and the SMF entity obtains a downlink message related to the terminal, which respectively include the following steps S508 and S509, and steps S510 and S511.

S508. The access device obtains an uplink message related to the terminal.

Refer to step S408 for related descriptions of step S508, and details are not described herein again.

Optionally, assuming that a group identifier of the terminal is the identifier 1, the access device continues to perform step S509*a*.

Alternatively, assuming that a group identifier of the terminal is the identifier 2, the access device continues to perform step S509*b*.

Alternatively, assuming that a group identifier of the terminal is the identifier 3, the access device continues to perform step S509*c*.

S509*a*. The access device sends the uplink message related to the terminal to the second AMF entity based on the group identifier 1, such that the second AMF entity receives the uplink message related to the terminal from the access device.

Optionally, the access device may determine, based on the backup group identifiers received in step S502*b* and the group identifier 1 obtained in step S508*a*, that an AMF entity corresponding to the group identifier 1 is the second AMF entity, to send the uplink message related to the terminal to the second AMF entity.

S509*b*. The access device sends the uplink message related to the terminal to the third AMF entity based on the group identifier 2, such that the third AMF entity receives the uplink message related to the terminal from the access device.

Optionally, the access device may determine, based on the backup group identifiers received in step S502c and the group identifier 2 obtained in step S508b, that an AMF entity corresponding to the group identifier 2 is the third AMF entity, to send the uplink message related to the terminal to the third AMF entity.

S509c. The access device sends the uplink message related to the terminal to the fourth AMF entity based on the group identifier 3, such that the fourth AMF entity receives the uplink message related to the terminal from the access device.

Optionally, the access device may determine, based on the backup group identifiers received in step S502d and the group identifier 3 obtained in step S508c, that an AMF entity corresponding to the group identifier 3 is the fourth AMF entity, to send the uplink message related to the terminal to the fourth AMF entity.

S510 is the same as S410. Refer to the embodiment shown in FIG. 4A, FIG. 4B, and FIG. 4C for details, and the details are not described herein again.

S511a to S511c are the same as S411a to S411c. Refer to the embodiment shown in FIG. 4A, FIG. 4B, and FIG. 4C for details, and the details are not described herein again.

A difference between this embodiment and the embodiment shown in FIG. 4A, FIG. 4B, and FIG. 4C is as follows. In the embodiment shown in FIG. 4A, FIG. 4B, and FIG. 4C, during initial configuration of the first AMF entity, the first AMF entity sends only the configured serving group identifiers to the access device, and only when another AMF entity detects that the exception occurs in the first AMF entity, the other AMF entity notifies the access device that a terminal corresponding to a corresponding serving group identifier is taken over by the other AMF entity. In the embodiment shown in FIG. 5A, FIG. 5B, and FIG. 5C, during initial configuration of an AMF entity, the AMF entity may send both configured serving group identifiers and configured backup group identifiers to the access device, and in this way, when the exception occurs in the first AMF entity that serves a terminal whose group identifier is the backup group identifier corresponding to the AMF entity, the AMF entity may take over the terminal, and serve the terminal. In addition, actions of the second AMF entity, the third AMF entity, and the fourth AMF entity are also similar to that of the first AMF entity, and details are not described herein again.

According to the communication method provided in this embodiment of this application, because the first AMF entity may synchronize a context of a served terminal to another AMF entity in which a group identifier of the terminal is configured, when an exception occurs in the first AMF entity, a message related to the terminal may be sent, based on the group identifier, to the other AMF entity in which the group identifier is configured. Therefore, when the exception occurs in the first mobility management entity, a case in which a re-registration process of the terminal that is being served is triggered because the context of the terminal is lost can be avoided. In other words, a current process of the terminal that is being served can remain uninterrupted. In addition, because the first AMF entity may group terminals, contexts of terminals in different terminal groups may be respectively backed up to a plurality of different AMF entities. In other words, one-to-many backup may be implemented. In this way, when the exception occurs in the first AMF entity, the plurality of different AMF entities separately takes over one or more terminal groups of the first AMF entity. Therefore, impact on a single AMF entity due to the exception of the first AMF entity is reduced, resources are saved compared with conventional 1+1 backup, and a problem that a context in an MME pool in a conventional system is lost is resolved.

All actions of the access device, the SMF entity, and each AMF entity in steps S501 to S511 may be performed by the processor 301 in the network device 300 shown in FIG. 3 by invoking the application program code stored in the memory 303. This is not limited in this embodiment of this application.

Optionally, for example, the communications system shown in FIG. 1 is applied to the 5G network shown in FIG. 2, and a configuration status of an AMF entity group is shown in Table 5. Assuming that the AMF entity 1 is a first AMF entity, the AMF entity 2 is a second AMF entity, the AMF entity 3 is a third AMF entity, and the AMF entity 4 is a fourth AMF entity, a communication method provided in an embodiment of this application may alternatively be shown in FIG. 6A, FIG. 6B, and FIG. 6C, and include the following steps.

Figure 6A:
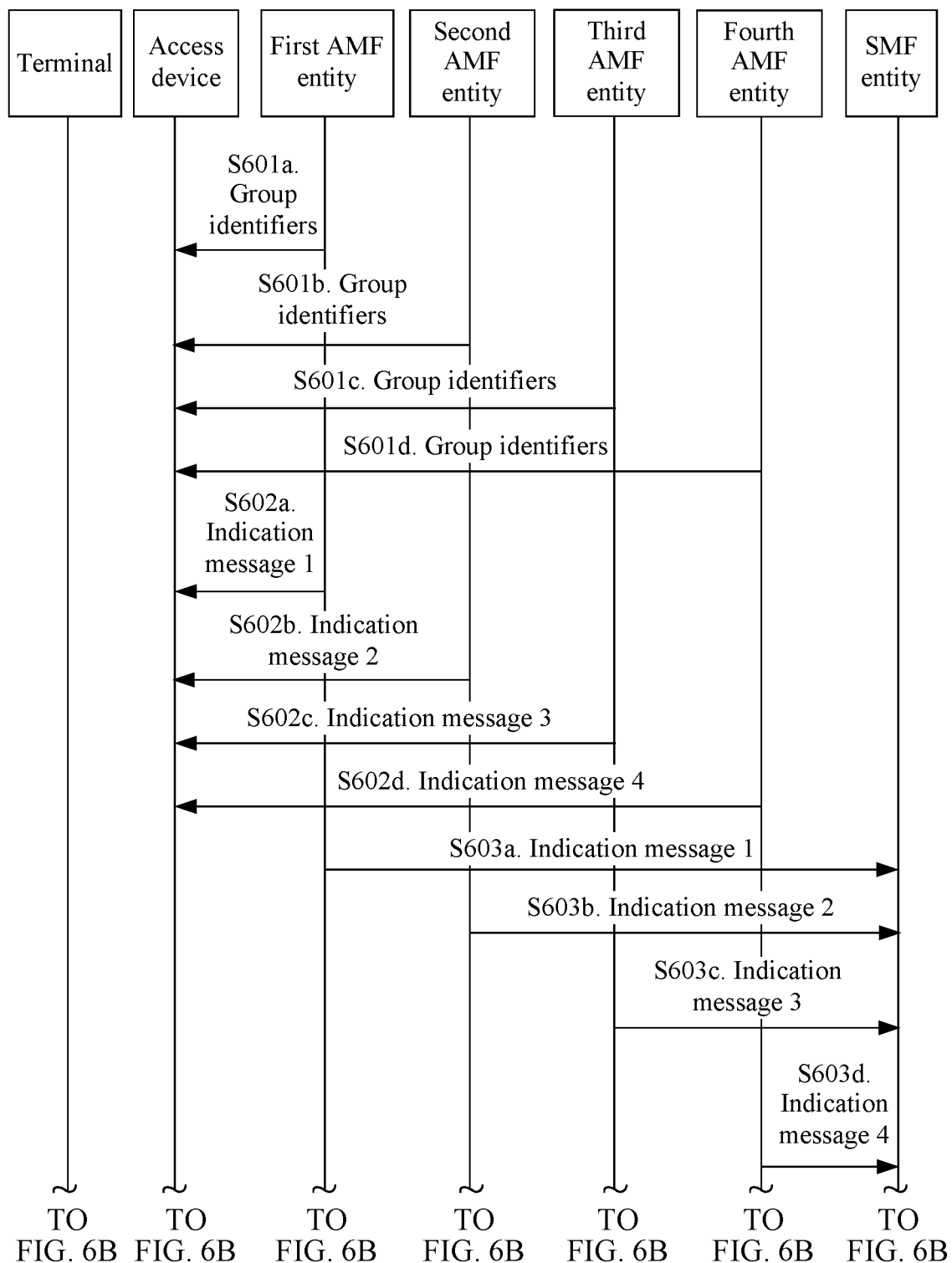
FIG. 6A, FIG. 6B, and FIG. 6C are schematic flowcharts 2 of a communication method according to an embodiment of this application.
Figure 6B:
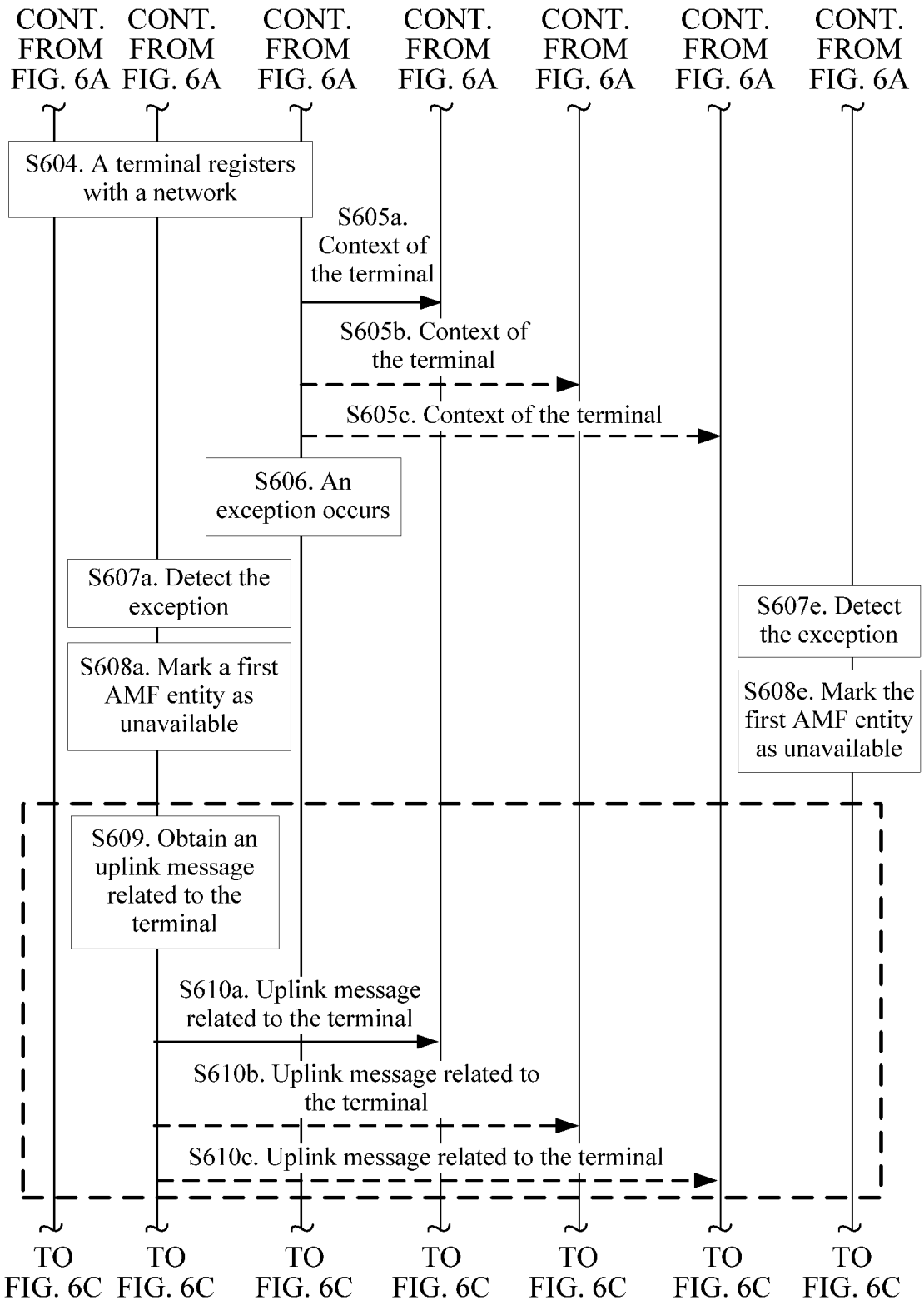
Figure 6C:
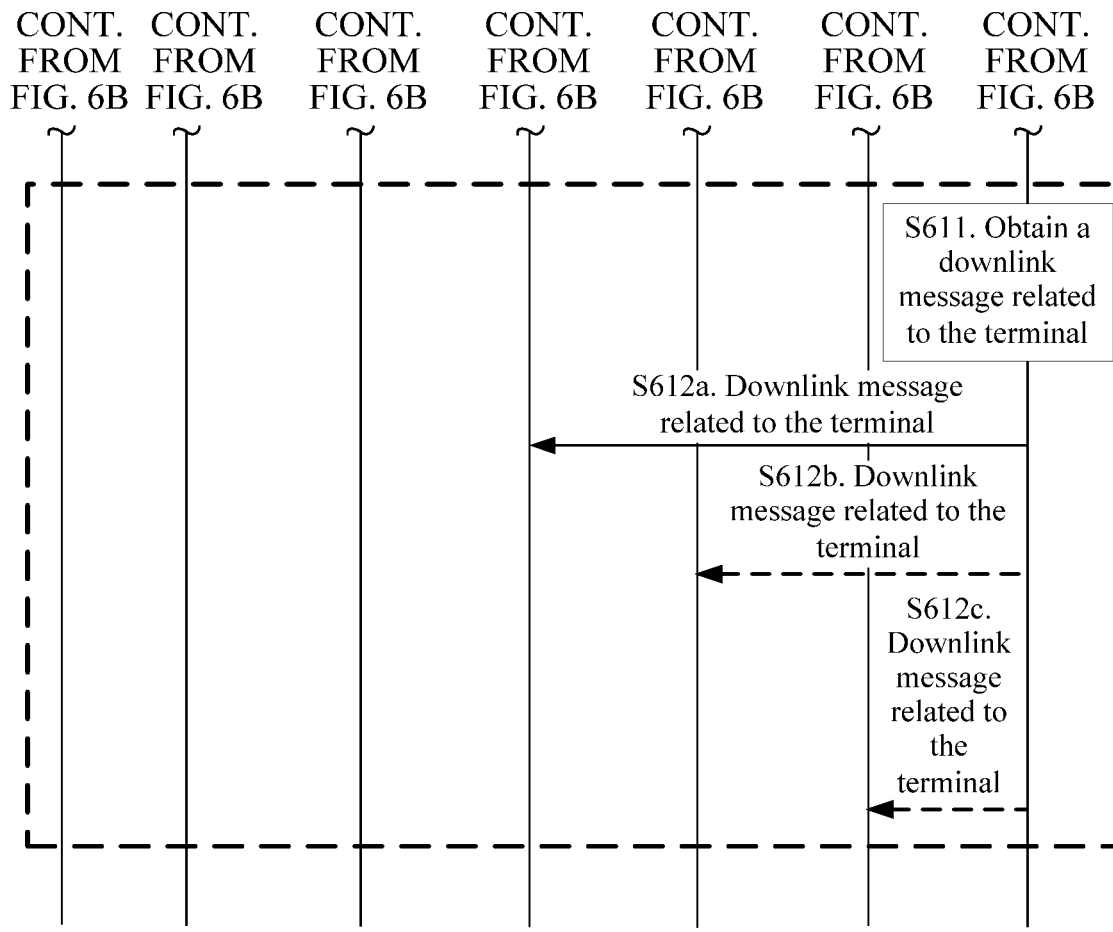

S601a to S601d are similar to S501a to S501d, and a difference only lies in that, in this embodiment shown in FIG. 6A, FIG. 6B, and FIG. 6C, group identifiers are used to replace the serving group identifiers in the embodiment shown in FIG. 5A, FIG. 5B, and FIG. 5C. Refer to the embodiment shown in FIG. 5A, FIG. 5B, and FIG. 5C for details, and the details are not described herein again.

S602a. The first AMF entity sends an indication message 1 to the access device, such that the access device receives the indication message 1 from the first AMF entity. The indication message 1 is used to indicate that when an exception occurs in the first AMF entity, a terminal in a terminal group corresponding to the identifier 1 is served by the second AMF entity, a terminal in a terminal group corresponding to the identifier 2 is served by the third AMF entity, and a terminal in a terminal group corresponding to the identifier 3 is served by the fourth AMF entity.

Optionally, after receiving the indication message 1, the access device may store a correspondence between the group identifier 1 and the first AMF entity and the second AMF entity, a correspondence between the group identifier 2 and the first AMF entity and the third AMF entity, and a correspondence between the group identifier 3 and the first AMF entity and the fourth AMF entity. The first AMF entity is used as a serving AMF entity of the group identifier 1, the group identifier 2, and the group identifier 3; the second AMF entity is used as a backup AMF entity of the group identifier 1; the third AMF entity is used as a backup AMF entity of the group identifier 2; and the fourth AMF entity is used as a backup AMF entity of the group identifier 3. In this way, the access device may subsequently select a corresponding AMF entity based on these correspondences. This is not specifically limited in this embodiment of this application.

S602b. The second AMF entity sends an indication message 2 to the access device, such that the access device receives the indication message 2 from the second AMF entity. The indication message 2 is used to indicate that when an exception occurs in the second AMF entity, a terminal in a terminal group corresponding to the identifier 4 is served by the first AMF entity, a terminal in a terminal group corresponding to the identifier 5 is served by the third AMF entity, and a terminal in a terminal group corresponding to the identifier 6 is served by the fourth AMF entity.

Optionally, after receiving the indication message 2, the access device may store a correspondence between the group identifier 4 and the second AMF entity and the first AMF entity, a correspondence between the group identifier 5 and the second AMF entity and the third AMF entity, and a correspondence between the group identifier 6 and the second AMF entity and the fourth AMF entity. The second AMF entity is used as a serving AMF entity of the group identifier 4, the group identifier 5, and the group identifier 6; the first AMF entity is used as a backup AMF entity of the group identifier 4; the third AMF entity is used as a backup AMF entity of the group identifier 5; and the fourth AMF entity is used as a backup AMF entity of the group identifier 6. In this way, the access device may subsequently select a corresponding AMF entity based on these correspondences. This is not specifically limited in this embodiment of this application.

S602c. The third AMF entity sends an indication message 3 to the access device, such that the access device receives the indication message 3 from the third AMF entity. The indication message 3 is used to indicate that when an exception occurs in the third AMF entity, a terminal in a terminal group corresponding to the identifier 7 is served by the first AMF entity, a terminal in a terminal group corresponding to the identifier 8 is served by the second AMF entity, and a terminal in a terminal group corresponding to the identifier 9 is served by the fourth AMF entity.

Optionally, after receiving the indication message 3, the access device may store a correspondence between the group identifier 7 and the third AMF entity and the first AMF entity, a correspondence between the group identifier 8 and the third AMF entity and the second AMF entity, and a correspondence between the group identifier 9 and the third AMF entity and the fourth AMF entity. The third AMF entity is used as a serving AMF entity of the group identifier 7, the group identifier 8, and the group identifier 9; the second AMF entity is used as a backup AMF entity of the group identifier 8; the first AMF entity is used as a backup AMF entity of the group identifier 7; and the fourth AMF entity is used as a backup AMF entity of the group identifier 9. In this way, the access device may subsequently select a corresponding AMF entity based on these correspondences. This is not specifically limited in this embodiment of this application.

S602d. The fourth AMF entity sends an indication message 4 to the access device, such that the access device receives the indication message 4 from the fourth AMF entity. The indication message 4 is used to indicate that when an exception occurs in the fourth AMF entity, a terminal in a terminal group corresponding to the identifier 10 is served by the first AMF entity, a terminal in a terminal group corresponding to the identifier 11 is served by the second AMF entity, and a terminal in a terminal group corresponding to the identifier 12 is served by the third AMF entity.

Optionally, after receiving the indication message 4, the access device may store a correspondence between the group identifier 10 and the fourth AMF entity and the first AMF entity, a correspondence between the group identifier 11 and the fourth AMF entity and the second AMF entity, and a correspondence between the group identifier 12 and the fourth AMF entity and the third AMF entity. The fourth AMF entity is used as a serving AMF entity of the group identifier 10, the group identifier 11, and the group identifier 12; the second AMF entity is used as a backup AMF entity of the group identifier 11; the third AMF entity is used as a backup AMF entity of the group identifier 12; and the first AMF entity is used as a backup AMF entity of the group identifier 10. In this way, the access device may subsequently select a corresponding AMF entity based on these correspondences. This is not specifically limited in this embodiment of this application.

Optionally, in this embodiment of this application, the group identifiers in step S601a and the indication message 1 in step S602a may be carried in one message and sent to the access device together, or may be sent to the access device separately using two messages. This is not specifically limited in this embodiment of this application. Similarly, the group identifiers in step S601b and the indication message 2 in step S602b may be carried in one message and sent to the access device together, or may be sent to the access device separately using two messages; the group identifiers in step S601c and the indication message 3 in step S602c may be carried in one message and sent to the access device together, or may be sent to the access device separately using two messages; and the group identifiers in step S601d and the indication message 4 in step S602d may be carried in one message and sent to the access device together, or may be sent to the access device separately using two messages. This is not specifically limited in this embodiment of this application.

Optionally, in this embodiment of this application, the first AMF entity may further send the group identifiers configured in the first AMF entity and the indication message 1 to an SMF entity; the second AMF entity may further send the group identifiers configured in the second AMF entity and the indication message 2 to the SMF entity; the third AMF entity may further send the group identifiers configured in the third AMF entity and the indication message 3 to the SMF entity; and the fourth AMF entity may further send the group identifiers configured in the fourth AMF entity and the indication message 4 to the SMF entity. In this way, the SMF entity may store a correspondence between each group identifier and a serving AMF entity and a backup AMF entity, such that the SMF entity can subsequently select a corresponding AMF entity based on the correspondence. Certainly, a group identifier of a terminal and information about an AMF entity that serves the terminal may also be sent to the SMF entity during PDU session establishment. This is not specifically limited in this embodiment of this application.

S603a to S603d are similar to S602a to S602d, and a difference only lies in that, the SMF entity is used in S603a to S603d to replace the access device in S602a to S602d. Refer to S602a to S602d for details, and the details are not described herein again.

S604 is the same as S503. Refer to the embodiment shown in FIG. 5A, FIG. 5B, and FIG. 5C for details, and the details are not described herein again.

S605a to S605c are the same as S504a to S504c. Refer to the embodiment shown in FIG. 5A, FIG. 5B, and FIG. 5C for details, and the details are not described herein again.

S606. An exception occurs in the first AMF entity.

When the exception occurs in the first AMF entity, the access device performs steps S607a and S608a, and the SMF entity performs steps S607e and S608e. Refer to the following steps for details.

S607a and S608a are the same as S506a and S507a. Refer to the embodiment shown in FIG. 5A, FIG. 5B, and FIG. 5C for details, and the details are not described herein again.

Optionally, when detecting that the exception occurs in the first AMF entity, the access device may respectively set AMF entities that serve terminals corresponding to the group identifiers of the first AMF entity, namely, the identifier 1, the identifier 2, and the identifier 3, to the second AMF entity, the third AMF entity, and the fourth AMF entity based on the indication messages received in 602a to 602d. This is not specifically limited in this embodiment of this application.

S607e and S608e are the same as S506e and S507e. Refer to the embodiment shown in FIG. 5A, FIG. 5B, and FIG. 5C for details, and the details are not described herein again.

Optionally, when detecting that the exception occurs in the first AMF entity, the SMF entity may respectively set AMF entities that serve the terminals corresponding to the group identifiers of the first AMF entity, namely, the identifier 1, the identifier 2, and the identifier 3, to the second AMF entity, the third AMF entity, and the fourth AMF entity based on the indication messages received in 603a to 603d. This is not specifically limited in this embodiment of this application.

S609 is the same as S508. Refer to the embodiment shown in FIG. 5A, FIG. 5B, and FIG. 5C for details, and the details are not described herein again.

S610a to S610c are similar to S509a to S509c, and a difference only lies in that, in S509a to S509c, the access device determines, based on a backup group identifier, an AMF entity corresponding to a group identifier, and in this embodiment of this application, an AMF entity corresponding to a group identifier is determined based on an indication message. Refer to the embodiment shown in FIG. 5A, FIG. 5B, and FIG. 5C for details, and the details are not described herein again.

S611 is the same as S510. Refer to the embodiment shown in FIG. 5A, FIG. 5B, and FIG. 5C for details, and the details are not described herein again.

S612a to S612c are the same as S511a to S511c. Refer to the embodiment shown in FIG. 5A, FIG. 5B, and FIG. 5C for details, and the details are not described herein again.

A difference between this embodiment and the embodiment shown in FIG. 5A, FIG. 5B, and FIG. 5C is as follows. In the embodiment shown in FIG. 5A, FIG. 5B, and FIG. 5C, both a serving group identifier and a backup group identifier are configured in an AMF entity, and when a fault occurs in the AMF entity, the access device may determine, based on the backup group identifier, an AMF entity that takes over a terminal whose group identifier is the serving group identifier managed by the AMF entity. In this embodiment shown in FIG. 6A, FIG. 6B, and FIG. 6C, only a group identifier of a terminal that is served by a serving AMF entity when no exception occurs in the serving AMF entity, and information about a backup AMF entity that takes over, when an exception occurs in the serving AMF entity, a terminal whose group identifier is the group identifier are configured in the serving AMF entity. Additionally, when a fault occurs in the AMF entity, the access device may determine, based on the information about the backup AMF entity, a backup AMF entity that takes over the terminal whose group identifier is the group identifier.

According to the communication method provided in this embodiment of this application, because the first AMF entity may synchronize a context of a served terminal to another AMF entity in which a group identifier of the terminal is configured, when an exception occurs in the first AMF entity, a message related to the terminal may be sent, based on the group identifier, to the other AMF entity in which the group identifier is configured. Therefore, when the exception occurs in the first mobility management entity, a case in which a re-registration process of the terminal that is being served is triggered because the context of the terminal is lost can be avoided. In other words, a current process of the terminal that is being served can remain uninterrupted. In addition, because the first AMF entity may group terminals, contexts of terminals in different terminal groups may be respectively backed up to a plurality of different AMF entities. In other words, one-to-many backup may be implemented. In this way, when the exception occurs in the first AMF entity, the plurality of different AMF entities separately takes over one or more terminal groups of the first AMF entity. Therefore, impact on a single AMF entity due to the exception of the first AMF entity is reduced, resources are saved compared with conventional 1+1 backup, and a problem that a context in an MME pool in a conventional system is lost is resolved.

All actions of the access device, the SMF entity, and each AMF entity in steps S601 to S612 may be performed by the processor 301 in the network device 300 shown in FIG. 3 by invoking the application program code stored in the memory 303. This is not limited in this embodiment of this application.

Optionally, in actual deployment, alternatively, the embodiment shown in FIG. 4A, FIG. 4B, and FIG. 4C and the embodiment shown in FIG. 5A, FIG. 5B, and FIG. 5C may be combined, or the embodiment shown in FIG. 4A, FIG. 4B, and FIG. 4C and the embodiment shown in FIG. 6A, FIG. 6B, and FIG. 6C may be combined. This is not specifically limited in this embodiment of this application.

The foregoing mainly describes the solutions provided in the embodiments of this application from the perspective of interaction between network elements. It can be understood that, to implement the foregoing functions, the communications device and the second mobility management entity include a corresponding hardware structure and/or software module for performing each of the functions. A person of ordinary skill in the art should be aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the communications device and the second mobility management entity may be divided based on the foregoing method examples. For example, function modules may be divided based on functions, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in actual implementation.

Figure 7:
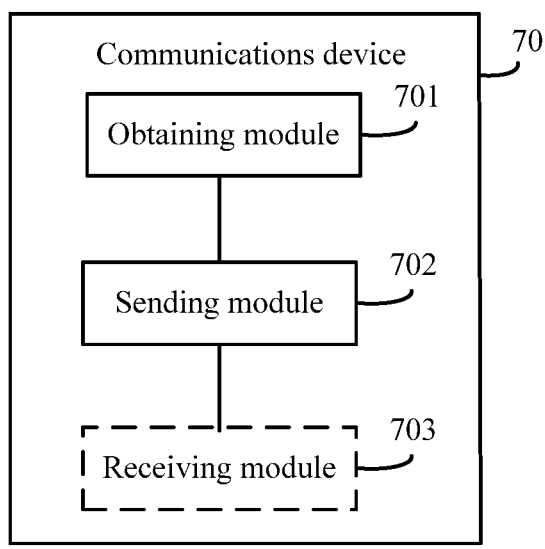
FIG. 7 is a schematic structural diagram 1 of a communications device according to an embodiment of this application.

For example, when the function modules are divided based on functions, FIG. 7 is a possible schematic structural diagram of a communications device 70 in the foregoing embodiments. The communications device 70 includes an obtaining module 701 and a sending module 702. The obtaining module 701 is configured to obtain a first group identifier of a terminal group to which a first terminal served by a first mobility management entity belongs. The sending module 702 is configured to send a message related to the first terminal to a second mobility management entity based on the first group identifier when an exception occurs in the first mobility management entity, where the second mobility management entity is a mobility management entity in which a context of the first terminal exists.

Optionally, the first group identifier is a serving group identifier configured in the first mobility management entity and a backup group identifier configured in the second mobility management entity.

In a possible implementation, as shown in FIG. 7, the communications device 70 further includes a receiving module 703. The receiving module 703 is configured to receive a first indication message, where the first indication message is used to indicate that a terminal in the terminal group corresponding to the first group identifier is served by the second mobility management entity.

Optionally, the receiving module 703 is configured to receive the first indication message from the second mobility management entity, where the first indication message is sent by the second mobility management entity to the communications device when the second mobility management entity determines that the exception occurs in the first mobility management entity.

In a possible implementation, the receiving module 703 is configured to receive a first indication message, where the first indication message is used to indicate that when the exception occurs in the first mobility management entity, a terminal in the terminal group corresponding to the first group identifier is served by the second mobility management entity.

Optionally, the receiving module 703 is configured to receive the first indication message before the exception occurs in the first mobility management entity. The sending module 702 is configured to: determine that the exception occurs in the first mobility management entity; and send the message related to the first terminal to the second mobility management entity based on the first group identifier.

Optionally, the obtaining module 701 is configured to: receive the message related to the first terminal, where the message related to the first terminal carries the first group identifier of the terminal group to which the first terminal belongs; or determine, from the context of the first terminal, the first group identifier of the terminal group to which the first terminal belongs.

Optionally, the obtaining module 701 is further configured to obtain a second group identifier of a terminal group to which a second terminal served by the first mobility management entity belongs. The sending module 702 is further configured to send a message related to the second terminal to a third mobility management entity based on the second group identifier when the exception occurs in the first mobility management entity, where the third mobility management entity is a mobility management entity in which a context of the second terminal exists.

Optionally, the communications device in this embodiment of this application is an access device or a session management entity.

All related content of each step in the foregoing method embodiments may be cited in function descriptions of a corresponding function module, and details are not described herein again.

Figure 8:
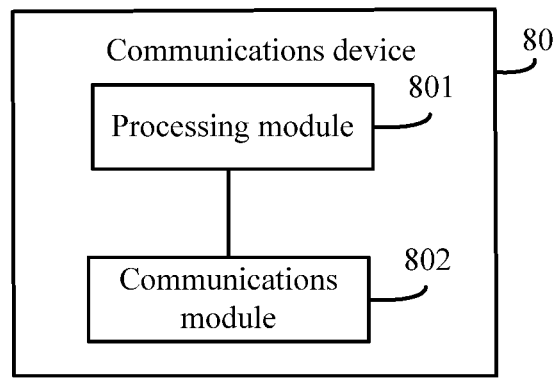
FIG. 8 is a schematic structural diagram 2 of a communications device according to an embodiment of this application.

When the function modules are divided in an integrated manner, FIG. 8 is a possible schematic structural diagram of a communications device 80 in the foregoing embodiments. The communications device 80 includes a processing module 801 and a communications module 802. The processing module 801 may be configured to perform an operation that can be performed by the obtaining module 701 in FIG. 7, and the communications module 802 may be configured to perform an operation that can be performed by the sending module 702 in FIG. 7. Optionally, the communications module 802 may be further configured to perform an operation that can be performed by the receiving module 703 in FIG. 7. Refer to the embodiment shown in FIG. 7 for details, and the details are not described in this embodiment of this application again.

All related content of each step in the foregoing method embodiments may be cited in function descriptions of a corresponding function module, and details are not described herein again.

In this embodiment, the communications device is presented in a form of dividing the function modules based on the functions, or the communications device is presented in a form of dividing the function modules in an integrated manner. The "module" herein may be an application-specific integrated circuit (ASIC), a circuit, a processor that executes one or more software or firmware programs and a memory, an integrated logic circuit, and/or another device that can provide the foregoing functions. In a simple embodiment, a person skilled in the art can figure out that the communications device 70 or the communications device 80 may be in the form shown in FIG. 3. For example, the obtaining module 701, the sending module 702, and the receiving module 703 in FIG. 7 may be implemented using the processor 401 and the memory 403 in FIG. 3. The obtaining module 701, the sending module 702, and the receiving module 703 may be performed by the processor 301 by invoking the application program code stored in the memory 303. This is not limited in this embodiment of this application. Alternatively, for example, the processing module 801 and the communications module 802 in FIG. 8 may be implemented using the processor 301 and the memory 303 in FIG. 3. The processing module 801 and the communications module 802 may be performed by the processor 301 by invoking the application program code stored in the memory 303. This is not limited in this embodiment of this application.

Because the communications device provided in this embodiment of this application may be configured to perform the foregoing communication methods, refer to the foregoing method embodiments for technical effects that can be obtained by the communications device. Details are not described herein again.

Figure 9:
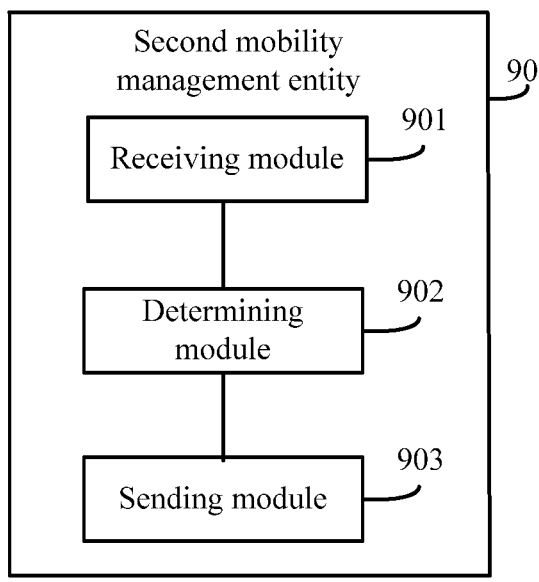
FIG. 9 is a schematic structural diagram 1 of a second mobility management entity according to an embodiment of this application.

Alternatively, for example, when the function modules are divided based on functions, FIG. 9 is a possible schematic structural diagram of a second mobility management entity 90 in the foregoing embodiments. The second mobility management entity 90 includes a receiving module 901, a determining module 902, and a sending module 903. The receiving module 901 is configured to receive, from a first mobility management entity, a context of a first terminal served by the first mobility management entity. The determining module 902 is configured to determine that an exception occurs in the first mobility management entity. The sending module 903 is configured to send a first indication message to a communications device, where the first indication message is used to indicate that a terminal in a terminal group corresponding to a first group identifier is served by the second mobility management entity, and the first group identifier is a group identifier of the terminal group to which the first terminal belongs.

Optionally, the receiving module 901 is further configured to receive a message related to the first terminal from the communications device.

Optionally, the receiving module 901 is further configured to receive, from the third mobility management entity, a context of a second terminal served by the third mobility management entity. The determining module 902 is further configured to determine that an exception occurs in the third mobility management entity. The sending module 903 is further configured to send a second indication message to the communications device, where the second indication message is used to indicate that a terminal in a terminal group corresponding to a second group identifier is served by the second mobility management entity, and the second group identifier is a group identifier of the terminal group to which the second terminal belongs.

All related content of each step in the foregoing method embodiments may be cited in function descriptions of a corresponding function module, and details are not described herein again.

Figure 10:
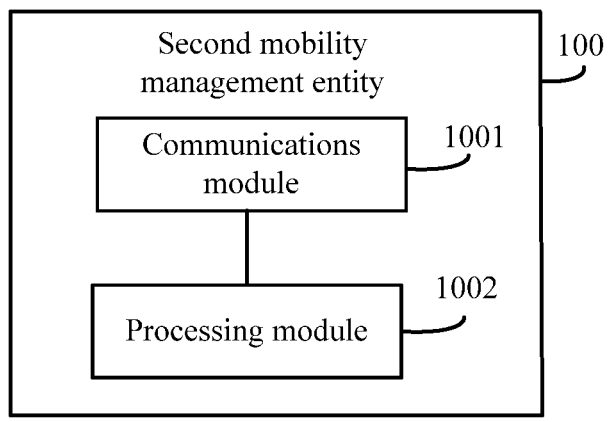
FIG. 10 is a schematic structural diagram 2 of a second mobility management entity according to an embodiment of this application.

When the function modules are divided in an integrated manner, FIG. 10 is a possible schematic structural diagram of a second mobility management entity 100 in the foregoing embodiments. The second mobility management entity 100 includes a processing module 1002 and a communications module 1001. The processing module 1002 may be configured to perform an operation that can be performed by the determining module 902 in FIG. 9, and the communications module 1001 may be configured to perform an operation that can be performed by the receiving module 901 and the sending module 903 in FIG. 9. Refer to the embodiment shown in FIG. 9 for details, and the details are not described in this embodiment of this application again.

All related content of each step in the foregoing method embodiments may be cited in function descriptions of a corresponding function module, and details are not described herein again.

In this embodiment, the second mobility management entity is presented in a form of dividing the function modules based on the functions, or the second mobility management entity is presented in a form of dividing the function modules in an integrated manner. The "module" herein may be an application-specific integrated circuit (ASIC), a circuit, a processor that executes one or more software or firmware programs and a memory, an integrated logic circuit, and/or another device that can provide the foregoing functions. In a simple embodiment, a person skilled in the art can figure out that the second mobility management entity 90 or the second mobility management entity 100 may be in the form shown in FIG. 3. For example, the receiving module 901, the determining module 902, and the sending module 903 in FIG. 9 may be implemented using the processor 301 and the memory 303 in FIG. 3. The receiving module 901, the determining module 902, and the sending module 903 may be performed by the processor 301 by invoking the application program code stored in the memory 303. This is not limited in this embodiment of this application. Alternatively, for example, the processing module 1002 and the communications module 1001 in FIG. 10 may be implemented using the processor 301 and the memory 303 in FIG. 3. The processing module 1002 and the communications module 1001 may be performed by the processor 301 by invoking the application program code stored in the memory 303. This is not limited in this embodiment of this application.

Because the second mobility management entity provided in this embodiment of this application may be configured to perform the foregoing communication methods, refer to the foregoing method embodiments for technical effects that can be obtained by the second mobility management entity. Details are not described herein again.

Optionally, an embodiment of this application provides a chip system. The chip system includes a processor configured to support a communications device in implementing functions in the foregoing aspects, for example, when an exception occurs in a first mobility management entity, sending a message related to a first terminal to a second mobility management entity based on a first group identifier of a terminal group to which the first terminal served by the first mobility management entity belongs. In a possible design, the chip system further includes a memory. The memory is configured to store a program instruction and data that are necessary for the communications device. The chip system may include a chip, or may include a chip and another discrete device. This is not specifically limited in this embodiment of this application.

Optionally, an embodiment of this application provides a chip system. The chip system includes a processor configured to support a second mobility management entity in implementing functions in the foregoing aspects, for example, receiving, from a first mobility management entity, a context of a first terminal served by the first mobility management entity. In a possible design, the chip system further includes a memory. The memory is configured to store a program instruction and data that are necessary for the second mobility management entity. The chip system may include a chip, or may include a chip and another discrete device. This is not specifically limited in this embodiment of this application.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to features and the embodiments thereof, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
   receiving, by an access device from a first mobility management entity that serves all terminals in a terminal group identified by a first group identifier, first indication information before a failure occurs in the first mobility management entity, wherein the first indication information comprises the first group identifier and information about a second mobility management entity, wherein the first indication information indicates that when the failure occurs in the first mobility management entity, the terminals in the terminal group identified by the first group identifier are served by a single mobility management entity, wherein the single mobility management entity is the second mobility management entity, and wherein contexts of each of the terminals exist in the second mobility management entity;
   receiving, by the access device from a first terminal, a message related to the first terminal, wherein the message comprises the first group identifier of the terminal group to which the first terminal belongs;
   sending, by the access device, the message to the second mobility management entity based on the first group identifier and the first indication information when the failure occurs in the first mobility management entity; and
   receiving, by the second mobility management entity, the message.

2. The communication method according to claim 1, wherein the first group identifier is a serving group identifier configured in the first mobility management entity and a backup group identifier configured in the second mobility management entity.

3. The communication method according to claim 1, wherein the first group identifier identifies, to the access device, the terminals in the terminal group, and wherein the first group identifier indicates that the terminals in the terminal group are served by the first mobility management entity before the failure occurs in the first mobility management entity.

4. The communication method according to claim 1, further comprising:
   obtaining, by the access device, a second group identifier of a second terminal group to which a second terminal served by the first mobility management entity belongs; and
   sending, by the access device, a second message related to the second terminal to a third mobility management entity based on the second group identifier when the failure occurs in the first mobility management entity, wherein a second context of the second terminal exists in the third mobility management entity.

5. A communications system, comprising:
   an access device configured to:
      receive, from a first mobility management entity that serves all terminals in a terminal group identified by a first group identifier, first indication information before a failure occurs in the first mobility management entity, wherein the first indication information comprises the first group identifier and information about a second mobility management entity, wherein the first indication information indicates that when the failure occurs in the first mobility management entity, the terminals in the terminal group identified by the first group identifier are served by a single mobility management entity, wherein the single mobility management entity is the second mobility management entity, and wherein contexts of each of the terminals exist in the second mobility management entity;
      receive, from a first terminal, a message related to the first terminal, wherein the message comprises the first group identifier of the terminal group to which the first terminal belongs; and
      send the message based on the first group identifier and the first indication information when the failure occurs in the first mobility management entity; and
   the second mobility management entity configured to receive the message from the access device.

6. The communications system according to claim 5, wherein the communications system further comprises the first mobility management entity, wherein the first mobility management entity is configured to send, to the second mobility management entity, the contexts of the terminals, wherein the first terminal is served by the first mobility management entity, and wherein the second mobility management entity is configured to receive the context contexts of the first terminal terminals from the first mobility management entity.

7. The communications system according to claim 5, wherein the access device is further configured to:
   obtain a second group identifier of a second terminal group to which a second terminal served by the first mobility management entity belongs; and
   send a second message related to the second terminal to a third mobility management entity based on the second group identifier when the failure occurs in the first mobility management entity, wherein the third mobility management entity is a mobility management entity in which a second context of the second terminal exists.

8. The communications system according to claim 5, wherein the first group identifier is a serving group identifier configured in the first mobility management entity and a backup group identifier configured in the second mobility management entity.

9. The method according to claim 1, wherein the first group identifier is a globally unique access and mobility management function identifier (GUAMI).

10. The method according to claim 1, further comprising:
   sending, by the first mobility management entity, the contexts of the terminals to the second mobility management entity; and
   receiving, by the second mobility management entity, the contexts of the terminals from the first mobility management entity.

11. The communications system according to claim 5, wherein the first group identifier is a globally unique access and mobility management function identifier (GUAMI).

12. The method according to claim 1, wherein the message is a non-access stratum (NAS) message.

13. The communications system according to claim 5, wherein the message is a non-access stratum (NAS) message.

14. An access device, comprising:
at least one processor; and
a non-transitory computer computer-readable storage medium coupled to the at least one processor and configured to store instructions for execution by the at least one processor such that when executed, cause the access device to:
receive, from a first mobility management entity that serves all terminals in a terminal group identified by a first group identifier, first indication information before a failure occurs in the first mobility management entity, wherein the first indication information comprises the first group identifier and information about a second mobility management entity, wherein the first indication information indicates that when the failure occurs in the first mobility management entity, the terminals in the terminal group identified by the first group identifier are served by a single mobility management entity, wherein the single mobility management entity is the second mobility management entity, and wherein contexts of each of the terminals exist in the second mobility management entity;
receive, from a first terminal, a message related to the first terminal, wherein the message comprises the first group identifier of the terminal group to which the first terminal belongs; and
send the message to the second mobility management entity based on the first group identifier and the first indication information when the failure occurs in the first mobility management entity.

15. The access device according to claim 14, wherein the first group identifier is a serving group identifier configured in the first mobility management entity and a backup group identifier configured in the second mobility management entity.

16. The access device according to claim 14, wherein the message is a non-access stratum (NAS) message.

17. A communication method, comprising:
receiving, by an access device from a first mobility management entity that serves all terminals in a terminal group identified by a first group identifier, first indication information before a failure occurs in the first mobility management entity, wherein the first indication information comprises the first group identifier and information about a second mobility management entity, wherein the first indication information indicates that when the failure occurs in the first mobility management entity, the terminals in the terminal group identified by the first group identifier are served by a single mobility management entity, wherein the single mobility management entity is the second mobility management entity, and wherein contexts of each of the terminals exist in the second mobility management entity;
receiving, by the access device, a message related to a first terminal from which the access device receives the message, wherein the message comprises the first group identifier of the terminal group to which the first terminal belongs; and
sending, by the access device, the message to the second mobility management entity based on the first group identifier and the first indication information when the failure occurs in the first mobility management entity.

18. The communication method according to claim 17, wherein the first group identifier is a serving group identifier configured in the first mobility management entity and a backup group identifier configured in the second mobility management entity.

19. The communication method according to claim 17, wherein the message is a non-access stratum (NAS) message.

20. The communication method according to claim 17, wherein the first group identifier is a globally unique access and mobility management function identifier (GUAMI).

* * * * *

UNITED STATES PATENT AND TRADEMARK OFFICE
CERTIFICATE OF CORRECTION

PATENT NO. : 11,184,757 B2  
APPLICATION NO. : 16/748340  
DATED : November 23, 2021  
INVENTOR(S) : Zaifeng Zong and Fenqin Zhu Page 1 of 1

It is certified that error appears in the above-identified patent and that said Letters Patent is hereby corrected as shown below:

On the Title Page

Page 2, item [56], delete "GN 1763684 A 4/2006" and insert --CN 1763684 A 4/2006--

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*